(12) United States Patent
Westberg

(10) Patent No.: US 11,153,654 B2
(45) Date of Patent: Oct. 19, 2021

(54) SYSTEMS AND METHODS FOR PROVIDING PROGRAM SUGGESTIONS IN AN INTERACTIVE TELEVISION PROGRAM GUIDE

(71) Applicant: Rovi Guides, Inc., San Jose, CA (US)

(72) Inventor: Thomas E. Westberg, Stow, MA (US)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 16/593,618

(22) Filed: Oct. 4, 2019

(65) Prior Publication Data
US 2020/0037032 A1 Jan. 30, 2020

Related U.S. Application Data

(63) Continuation of application No. 16/509,312, filed on Jul. 11, 2019, which is a continuation of application
(Continued)

(51) Int. Cl.
| | |
|---|---|
| H04N 21/466 | (2011.01) |
| H04N 7/16 | (2011.01) |
| H04N 21/442 | (2011.01) |
| H04N 21/45 | (2011.01) |
| H04N 21/475 | (2011.01) |
| H04N 21/482 | (2011.01) |
| H04N 21/47 | (2011.01) |
| H04N 21/41 | (2011.01) |

(52) U.S. Cl.
CPC ......... *H04N 21/4667* (2013.01); *H04N 7/163* (2013.01); *H04N 21/4135* (2013.01); *H04N 21/44222* (2013.01); *H04N 21/4532* (2013.01); *H04N 21/4668* (2013.01); *H04N 21/47* (2013.01); *H04N 21/4755* (2013.01); *H04N 21/4756* (2013.01); *H04N 21/4821* (2013.01); *H04N 21/4826* (2013.01)

(58) Field of Classification Search
None
See application file for complete search history.

(56) References Cited

U.S. PATENT DOCUMENTS

| | | |
|---|---|---|
| 5,758,259 A | 5/1998 | Lawler |
| 6,408,437 B1 | 6/2002 | Hendricks et al. |
| (Continued) | | |

FOREIGN PATENT DOCUMENTS

WO  WO-97/48230  12/1997

*Primary Examiner* — Jefferey F Harold
*Assistant Examiner* — Charles N Hicks
(74) *Attorney, Agent, or Firm* — Haley Guiliano LLP

(57) ABSTRACT

An interactive television program guide application is provided that queries a user regarding the user's interest in television programs and suggests television programs to the user based on the user's responses. The interactive television program guide application identifies a television program that is potentially of interest to the user. The interactive television program guide application then queries the user regarding the user's interest using questions that are formulated based on attributes associated with the identified television program. Using the user's responses to the questions, the interactive television program guide application identifies and suggests one or more television programs to the user.

30 Claims, 16 Drawing Sheets

Related U.S. Application Data

No. 14/941,981, filed on Nov. 16, 2015, now Pat. No. 10,484,740, which is a continuation of application No. 14/557,077, filed on Dec. 1, 2014, now Pat. No. 9,191,719, which is a continuation of application No. 13/165,209, filed on Jun. 21, 2011, now Pat. No. 8,904,441, which is a continuation of application No. 10/703,989, filed on Nov. 6, 2003, now Pat. No. 7,984,468.

(56) References Cited

U.S. PATENT DOCUMENTS

| | | | |
|---|---|---|---|
| 6,947,935 B1* | 9/2005 | Horvitz | H04N 21/4755 |
| 7,028,323 B2 | 4/2006 | Franken et al. | |
| 7,127,402 B2 | 10/2006 | Ross et al. | |
| 7,721,320 B2 | 5/2010 | Wennerstrom et al. | |
| 8,904,441 B2 | 12/2014 | Westberg | |
| 9,191,719 B2* | 11/2015 | Westberg | H04N 5/44543 |
| 10,484,740 B2 | 11/2019 | Westberg | |
| 2001/0029610 A1 | 10/2001 | Corvin et al. | |
| 2001/0034740 A1* | 10/2001 | Kerne | G06F 16/40 |
| | | | 715/202 |
| 2002/0059610 A1 | 5/2002 | Ellis | |
| 2002/0072989 A1 | 6/2002 | Van De Sluis | |
| 2002/0178440 A1 | 11/2002 | Agnihotri et al. | |
| 2002/0188948 A1 | 12/2002 | Florence | |
| 2003/0028889 A1 | 2/2003 | McCoskey | |
| 2003/0061239 A1 | 3/2003 | Yoon | |
| 2003/0126607 A1 | 7/2003 | Phillips | |
| 2003/0225777 A1* | 12/2003 | Marsh | H04N 7/163 |
| 2004/0073482 A1* | 4/2004 | Wiggins | G06Q 30/0252 |
| | | | 705/14.5 |
| 2004/0216158 A1 | 10/2004 | Blas | |
| 2005/0262542 A1 | 11/2005 | DeWeese et al. | |
| 2010/0175084 A1 | 7/2010 | Ellis et al. | |
| 2011/0047487 A1 | 2/2011 | DeWeese et al. | |

* cited by examiner

1300

| My Favorites | Favorites List — 1314 | Previously Watched — 1322 | Recommended — 1316  1318 — Coming up today | 12:00 |
|---|---|---|---|---|
| | | 1302 | 1320 — Coming up this week | |

These programs are about to start

| Thursday | ▽ 1304  12:00 pm | 12:30 pm  △ 1306 |
|---|---|---|
| KOKI  25 | Simpsons | ▲ Simpsons |
| KTUL  35 | Friends  ▽ 1310 | Friends  △ 1308 |

You may also like these

| KFOG  66 | King of the Hill  ▽ 1312 | |

Program Guide

| Thursday | 12:00 pm | 12:30 pm | 12:00 |
|---|---|---|---|
| ESPN 22 | NBA Basketball | | |
| TNN 23 | Miami Vice | Miami Vice | |

These favorites are available in this time frame

| Thursday | 12:00 | 12:30 |
|---|---|---|
| KOKI 25 | Simpsons | |
| KTUL 35 | Friends | Friends |

These suggested programs are available in this time frame

| KFOG 66 | King of the Hill |

Close 1600, 1602, 1604

SYSTEMS AND METHODS FOR PROVIDING PROGRAM SUGGESTIONS IN AN INTERACTIVE TELEVISION PROGRAM GUIDE

This application is a continuation of U.S. patent application Ser. No. 16/509,312, filed Jul. 11, 2019, which is a continuation of U.S. patent application Ser. No. 14/941,981, filed Nov. 16, 2015, which is a continuation of U.S. patent application Ser. No. 14/557,077, filed Dec. 1, 2014 (now U.S. Pat. No. 9,191,719), which is a continuation of U.S. patent application Ser. No. 13/165,209, filed Jun. 21, 2011 (now U.S. Pat. No. 8,904,441), which is a continuation of U.S. patent application Ser. No. 10/703,989, filed Nov. 6, 2003 (now U.S. Pat. No. 7,984,468), each of which is herein incorporated by reference in its entirety, respectively.

BACKGROUND OF THE INVENTION

This invention relates to television systems, and more particularly, this invention relates to interactive television systems such as interactive television program guide systems that suggest television programs to a user.

Cable, satellite, and broadcast television systems provide users with a large number of television channels. Users have traditionally consulted printed television program schedules to determine the programs being broadcasted at a particular time. As the number of available programs has increased, various television program guides, such as interactive television program guides, have been developed to help users select television programs of interest.

In some known systems, an interactive television program guide application allows a user to supply selection criteria which are used by the interactive television program guide application to select television programs that are of interest to the user. The selected television programs may be, for example, displayed for the user, recorded on a personal video recorder, or added to the user's favorite list. Interactive television program guide applications that select television programs for a user based on user-defined selection criteria are described, for example, in U.S. Pat. Nos. 4,706,121, 5,353,121, and 6,133,909.

Usually, the user of such known systems is required to specify a list of selection criteria and request a search based on the criteria to enable the interactive television program guide application to select television programs that are potentially of interest to the user. Such a process for providing a user with recommended programming can be tedious. Furthermore, some users may not even be aware that an option exists to allow specification of such selection criteria.

Accordingly, it would be desirable to provide an interactive television program guide application that automatically queries a user regarding the user's interest in various television programs to assist the user in selecting future television programs of interest.

SUMMARY OF THE INVENTION

In accordance with the present invention, an interactive television program guide application is provided that automatically queries a user regarding the user's interest in various television programs. The interactive television program guide application uses the user's responses to suggest to the user television programs that are potentially of interest.

In some embodiments of the present invention, the interactive television program guide application may monitor the user's television viewing pattern to identify a television program that is potentially of interest to the user. For example, the interactive television program guide application may determine that the user's viewing pattern associated with a television program satisfies one or more predetermined criteria for identifying potential television programs of interest (e.g., the user has continuously watched the television program for a time period that is greater than a predetermined time period). In making such a determination, the interactive television program guide application may mark the television program as a potential television program of interest.

The interactive television program guide application may then query the user using questions that are formulated based on attributes associated with the identified potential television program of interest. For example, the interactive television program guide application may determine from an attribute associated with the television program that the program is a movie having a sequel. In response to making this determination, the interactive television program guide application may formulate a question to prompt the user to set a reminder for the sequel.

Using the user's responses to the various questions, the interactive television program guide application may identify one or more television programs to suggest to the user.

Further features of the invention, its nature and various advantages will be more apparent from the accompanying drawings and the following detailed description of the preferred embodiments.

BRIEF DESCRIPTION OF THE DRAWINGS

FIG. 13 shows an illustrative favorites screen in accordance with the present invention.

FIG. 16 shows an illustrative interactive television program guide screen containing a suggestion overlay in accordance with the present invention.

DETAILED DESCRIPTION OF THE
PREFERRED EMBODIMENTS

Figure 1:
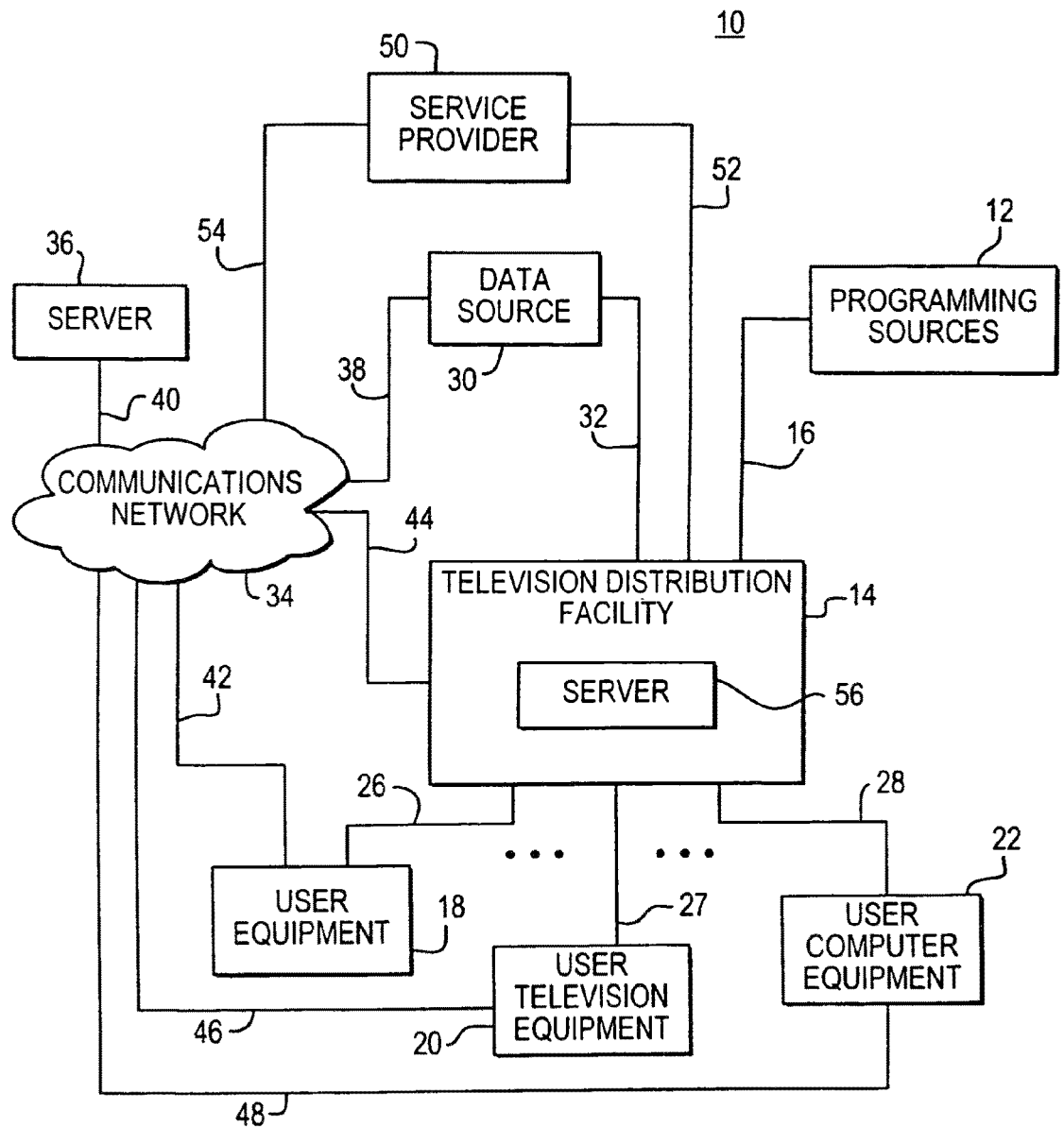
FIG. 1 is a diagram of an illustrative interactive television system in accordance with the present invention.

An illustrative interactive television system 10 in accordance with the present invention is shown in FIG. 1. Content such as television programming and digital music may be provided from programming sources 12 to television distribution facilities such as television distribution facility 14 using communications path 16. Programming sources 12 may be any suitable sources of television and music programming, such as television and music production studios, or any other suitable source of programming.

Television distribution facility 14 may be a cable system headend, a satellite television distribution facility, a television broadcast facility, or any other suitable facility for distributing television and music programming to users. There are typically numerous television distribution facilities 14 in system 10, but only one is shown in FIG. 1 to avoid overcomplicating the drawings.

Communications path 16 may be a satellite path, a fiber-optic path, a cable path, or any other suitable wired or wireless communications paths or a combination of such paths.

Television distribution facility 14 may be connected to various user equipment devices 18. Such user equipment 18 may, for example, be located in the homes of users. User equipment 18 may include user television equipment 20 or user computer equipment 22.

User equipment 18 may receive television and music programming and other information from television distribution facility 14 over communications paths such as communications paths 26, 27, and 28. User equipment 18 may also transmit signals to television distribution facility 14 over paths 26, 27, and 28. Paths 26, 27, and 28 may be cables or other wired connections, free-space connections (e.g., for broadcast or other wireless signals), satellite links, or any other suitable communications link.

Any suitable communications scheme may be used to transmit data over paths 26, 27, and 28, including in-band transmissions, out-of-band transmissions, digital transmissions, analog transmissions, cable transmissions, satellite transmissions, cable modem transmissions, over-the-air transmissions, multichannel multipoint distribution services (MMDS) transmissions, or any other suitable communication scheme.

If desired, interactive television program guide application data may be distributed over an out-of-band channel on paths 26, 27, and 28 or over an in-band path such as the vertical blanking interval (VBI). Advertising information may be distributed using any of a number of suitable techniques. For example, text and graphics advertisements may be distributed over an out-of-band channel using an out-of-band modulator. Video advertisements may also be distributed in this way, although large quantities of video information may be more efficiently distributed using one or more digital channels or data streams on paths 26, 27, and 28. Such digital channels or data streams may also be used for distributing text and graphics.

Data source 30 may include a program listings database that is used to provide the user with television program schedule information such as scheduled broadcast times, titles, channels, ratings information (e.g., parental ratings and critic's ratings), detailed title descriptions, genre or category information (e.g., sports, news, movies, etc.), information on actors and actresses, running times, or any other suitable information. Data source 30 may also be used to provide advertisements (e.g., program guide advertisements and advertisements for other interactive television applications), real-time data such as sports scores, stock quotes, news, weather, or any other suitable data. Although data source 30 is drawn as an individual box in FIG. 1, data source 30 and the other system components of FIG. 1 may be provided using equipment at one or more locations. Systems components are drawn as single boxes in FIG. 1 to avoid over-complicating the drawings.

Data source 30 may provide program schedule information and other data to television distribution facility 14 over communications path 32 for distribution to the associated user equipment over paths 26, 27, and 28. Communications path 32 may be any suitable communications path such as a satellite communications path or other wireless path, a fiber-optic or other wired communications path, a path that supports Internet communications, any other suitable communications path, or a combination of such paths. Data source 30 may provide program schedule information and other data to the user at user equipment 18 over path 38, communications network 34, and path 42. Path 42 may be a wired path such as a telephone line, a cable path, a fiber-optic path, a satellite path, a wireless path, a combination of such paths, or any other suitable path.

User equipment devices such as user television equipment and personal computers may use the program schedule information to display program listings and information on digital music for the user. An interactive television program guide application or other suitable application may be used to display such information on the user's display.

The present invention is primarily discussed herein in the context of the interactive television program guide application. The interactive television program guide application may include any suitable software, hardware, or both used to implement the features of the present invention.

An on-line program guide and other interactive television services may be provided using a server connected to communications network 34 such as server 36. Server 36 may receive program schedule information and other data from data source 30 via communications path 38, communications network 34, and communications path 40. Paths 38 and 40 may be satellite paths, fiber-optic paths, wired paths, or any other suitable communications path. Communications network 34 may be any suitable communications network, such as the Internet, the public switched telephone network, a packet-based network, or any other suitable communications network.

User equipment 18 may access on-line program guide information and other information from server 36 via communications path 42. User equipment 18 may also access the on-line program guide and other services on server 36 via communications path 26, television distribution facility 14, and communications path 44. For example, a cable modem or other suitable equipment may be used by user equipment 18 to communicate with television distribution facility 14. Television distribution facility 14 may communicate with communications network 34 over any suitable path 44, such as a wired path, a cable path, fiber-optic path, satellite path, any other suitable communications path, or a combination of such paths.

User equipment 18, which may include user television equipment 20 and user computer equipment 22, may access the on-line program guide and server 36 using similar arrangements. User television equipment 20 may access the on-line program guide and server 36 using communications path 46 or using path 27, television distribution facility 14, and path 44. User computer equipment 22 may access the on-line program guide and server 36 using communications path 48 or using path 28, television distribution facility 14, and path 44. Paths 46 and 48 may be any suitable paths, such as wired paths, cable paths, fiber-optic paths, wireless paths, satellite paths, any other suitable communications path, or a combination of such paths.

Program guide application functions and the functions of other interactive television applications may be supported using server 36 and other servers connected to communications network 34 such as server 56. Interactive television applications may also be supported by servers or other suitable equipment at one or more service providers such as service provider 50. For example, a home shopping service may be supported by a service provider such as service provider 50 that has sales representatives, order fulfillment facilities, account maintenance facilities, and other equipment for supporting interactive home shopping features. A home shopping application that is implemented using user equipment 18 may be used to access the service provider to provide these features to the user. User equipment 18 may access service provider 50 via television distribution facility 14 and communications path 52 or via communications network 34 and communications path 54. Communications paths such as paths 52 and 54 may be any suitable paths, such as wired paths, cable paths, fiber-optic paths, satellite paths, any other suitable communications path, or a combination of such paths.

Another example of an interactive television application is a home banking application. A home banking service may be supported using personnel at facilities such as service provider 50. An interactive home banking application that is implemented using user equipment 18 may access the home banking service via television distribution facility 14 and communications path 52 or via communications network 34 and communications path 54.

If desired, an interactive television application such as a network-based video recorder or a video-on-demand application may be supported using server 56, server 36, or equipment at service provider 50. Video-on-demand content and video recorded using a network-based video recorder arrangement may be stored on server 56 or server 36 or at service provider 50 and may be provided to user equipment 18 when requested by users. An interactive television application may be used to support the functions of a personal video recorder (sometimes called a digital video recorder) that is implemented using user equipment 18. Illustrative equipment that may be used to support personal video recorder functions include specialized personal video recorder devices, integrated receiver decoders (IRDs), set-top boxes with integrated or external hard drives, or personal computers with video recording capabilities.

If desired, applications such as the interactive television program guide application, a home shopping application, a home banking application, a video-on-demand application, game applications, and other applications (e.g., applications related to e-mail and chat or other communications functions) may be provided as separate applications that are accessed through a navigation shell application (i.e., a menu application with menu options corresponding to the applications). The features of such applications may be combined. For example, games, video-on-demand services, home shopping, network-based video recorder functions, personal video recorder functions, navigational functions, program guide functions, communications functions, and other suitable functions may be provided using one application or any other suitable number of applications.

Moreover, the interactive television program guide application, the home banking application, the home shopping application, the network-based video recorder and personal video recorder applications, the video-on-demand application, the gaming applications, communications applications, and navigational applications, are only a few illustrative examples of the types of interactive television applications that may be supported by system 10. Other suitable applications that may be supported include, news services, web browsing and other Internet services, and interactive wagering services (e.g., for wagering on horse races and the like).

The interactive television application or applications that are used in interactive television system 10 may be implemented locally on user equipment 18. The applications may also be implemented in a distributed fashion (e.g., using a client-server architecture in which user equipment 18 serves at least partly and for at least some of the time, as the client and a server such as server 56 at television distribution facility 14, server 36, or other suitable equipment acts as the server). Other distributed architectures may also be used if desired. Some or all of the interactive television system features of system 10 may be provided using operating system software or middleware software. Such operating system software and middleware may be used instead of or in combination with application-level software. Regardless of the particular arrangement used to implement interactive television features related to program guides, home shopping, home banking, video-on-demand, Internet, communications, or any other suitable application program, the software that supports these features may be referred to as an application or applications.

Figure 2:
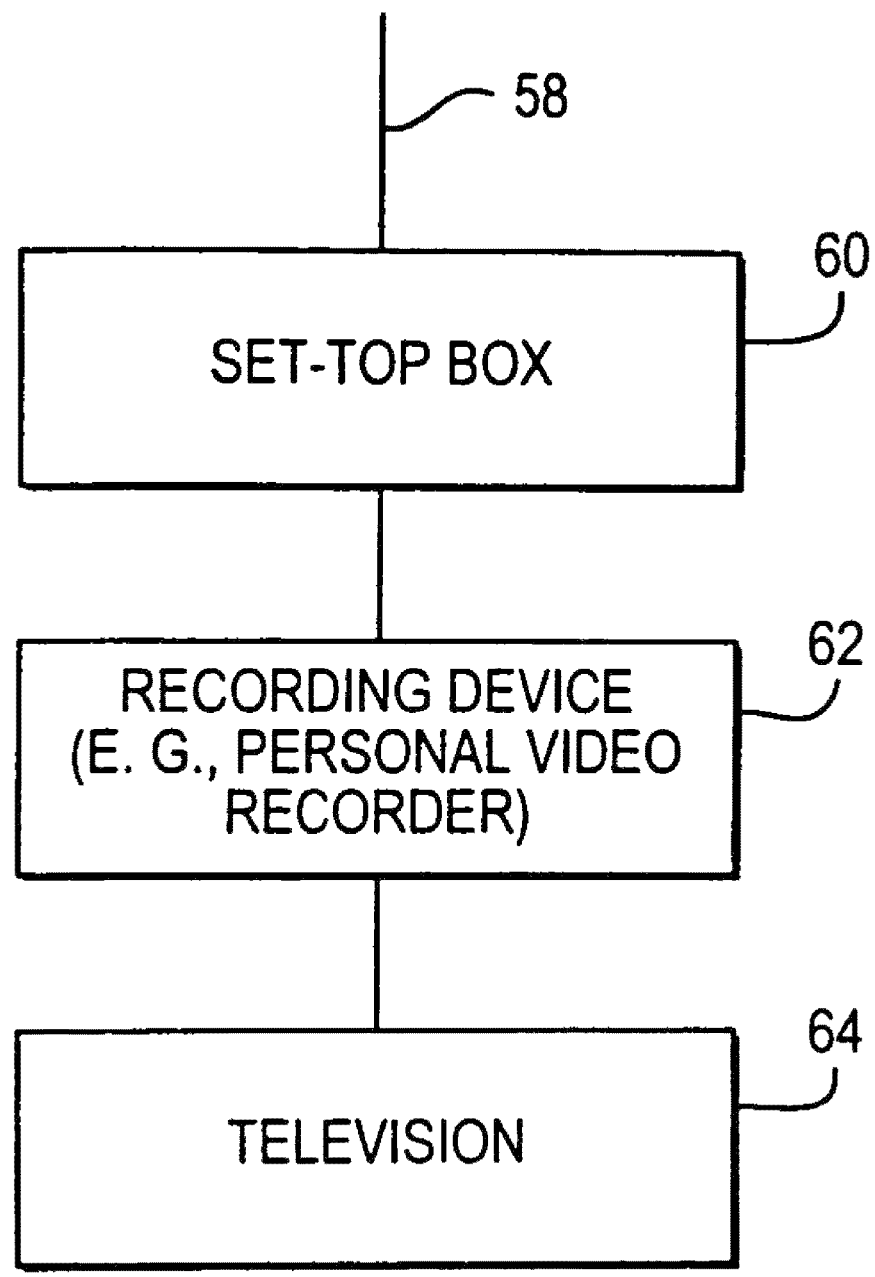
FIG. 2 is a diagram of illustrative user television equipment in accordance with the present invention.

Illustrative user television equipment 20 that is based on a set-top box arrangement is shown in FIG. 2. Input/output 58 may be connected to communications paths such as paths 27 and 46. Input/output functions may be provided by one or more wires or communications paths, but are shown as a single path in FIG. 2 to avoid overcomplicating the drawing. Television programming and other information may be received using input/output 58. Commands and requests and other information from the user may also be transmitted over input/output 58.

Set-top box 60 may be any suitable analog or digital set-top box (e.g., a cable set-top box). Set-top box 60 may contain an analog tuner for tuning to a desired analog television channel. Set-top box 60 may also contain digital decoding circuitry for receiving digital television and music channels. Both analog and digital channels may be handled together if desired. Multiple tuners may be provided (e.g., to handle simultaneous watch and record functions). Box 60 may be an integrated receiver decoder (IRD) that handles satellite television. If desired, box 60 may have circuitry for handling cable, over-the-air broadcast, and satellite content. Box 60 may include a storage device (e.g., a digital storage device such as a hard disk drive) for providing recording capabilities. Box 60 may also be connected to a recording device 62 such as a video cassette recorder, personal video recorder, or other device or devices with storage capabilities.

Set-top box 60 contains a processor (e.g., a microcontroller or microprocessor or the like) that is used to execute software applications. Set-top box 60 may contain memory such as random-access memory for use when executing applications. Nonvolatile memory may also be used (e.g., to launch a boot-up routine and other instructions). Hard disk storage in box 60 or in recording device 62 may be used to back up data and to otherwise support larger databases and storage requirements than may be supported using random-access memory approaches.

Set-top box 60 may have infrared (IR) or other communications circuitry for communicating with a remote control or wireless keyboard. Set-top box 60 may also have dedicated buttons and a front-panel display. The front-panel display may, for example, be used to display the current channel to which the set-top box is tuned.

Set-top box 60 may also have communications circuitry such as a cable modem, an integrated services digital network (ISDN) modem, a digital subscriber line (DSL) modem, a telephone modem, wireless modem, or any other suitable communications circuitry, for communications with other equipment. Such communications may involve the Internet or any other suitable communications networks or paths. If desired, the components of set-top box 60 may be integrated into other user equipment (e.g., a television or videocassette recorder).

Recording device 62 may be used to record videos provided by set-top box 60. For example, if set-top box 60 is tuned to a given television channel, the video signal for that television channel may be passed to recording device 62 for recording on a videocassette, compact disc, digital video disk, or internal hard drive or other storage device. Recording device 62 may have communications circuitry such as a cable modem, an ISDN modem, a DSL modem, a telephone modem, or any other suitable communications circuitry, for communications with other equipment. Such communications may involve the Internet or any other suitable communications networks or paths. The components of recording device 62 may be integrated into other user equipment (e.g., a television, stereo equipment, or any other suitable user equipment).

Recording device 62 may be controlled using a remote control or other suitable user interface. If desired, video recorder functions such as start, stop, record, etc. and other functions for device 62 may be controlled by set-top box 60. For example, set-top box 60 may control recording device 62 using infrared commands directed toward the remote control inputs of recording device 62 or set-top box 60 may control recording device 62 using other wired or wireless communications paths between box 60 and device 62.

The output of recording device 62 may be provided to television 64 for display to the user. If desired, multiple recording devices 62 or no recording device 62 may be used. If recording device 62 is not present or is not being actively used, the video signals from set-top box 60 may be provided directly to television 64. Any suitable television or monitor may be used to display the video. In the equipment of FIG. 2 and the other equipment of system 10, the audio associated with various video items is typically distributed with those video items and is generally played back to the user as the videos are played.

Figure 3:
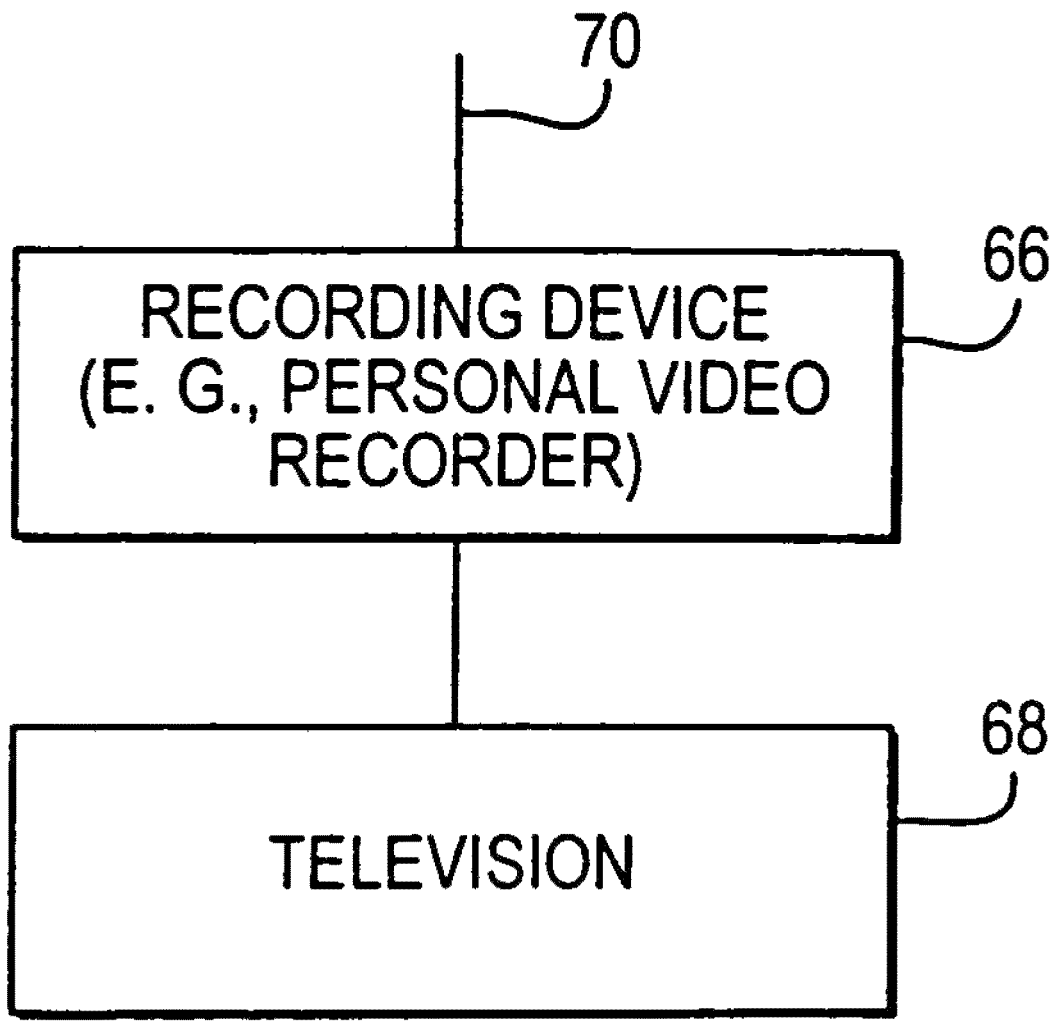
FIG. 3 is a diagram of additional illustrative user television equipment in accordance with the present invention.

Another illustrative arrangement for user television equipment 20 is shown in FIG. 3. In the example of FIG. 3, user television equipment 20 includes a recording device 66 such as a digital video recorder (e.g., a personal video recorder (PVR)) that uses a hard disk or other storage for recording video or may be a digital video disc recorder, compact disc recorder, videocassette recorder, or other suitable recording device. Equipment 20 of FIG. 3 may also include a television 68. Input/output 70 may be connected to communications paths such as paths 27 and 46. Television programming and other information may be received using input/output 70. Commands and requests and other information from the user may be transmitted over input/output 70.

Recording device 66 may contain at least one analog tuner for tuning to a desired analog television channel (e.g., multiple tuners may be provided). Recording device 66 may also contain digital decoding circuitry for receiving digital television and music channels. If desired, recording device 66 may contain circuitry for handling both analog and digital channels. Recording device 66 also contains a processor (e.g., a microcontroller or microprocessor or the like) that is used to execute software applications. Recording device 66 may contain memory such as random-access memory for use when executing applications. Nonvolatile memory may also be used to store a boot-up routine or other instructions. The hard disk and other storage in recording device 66 may be used to support databases (e.g., program guide databases or interactive television application databases). The hard disk or other storage in recording device 66 may also be used to record video such as television programs or video-on-demand content or other content provided to recording device 66 over input/output 70.

Recording device 66 may have IR communications circuitry or other suitable communications circuitry for communicating with a remote control. Recording device 66 may also have dedicated buttons and a front-panel display. The front-panel display may, for example, be used to display the current channel to which the recording device is tuned.

Recording device 66 may also have communications circuitry such as a cable modem, an ISDN modem, a DSL modem, a telephone modem, a wireless modem, or any other suitable communications circuitry, for communications with other equipment. Such communications may involve the Internet or other suitable communications networks or paths.

If desired, recording device 66 may include a satellite receiver or other equipment that has wireless communications circuitry for receiving satellite signals.

Recording device 66 of FIG. 3 or recording device 62 of FIG. 2 may record new video while previously recorded video is being played back on television 68 or 64. This allows users to press a pause button during normal television viewing. When the pause button is pressed, the current television program is stored on the hard disk of digital video recorder 66. When the user presses play, the recorded video may be played back. This arrangement allows the user to seamlessly pause and resume television viewing. Recording device 66 and 62 may also be used to allow a user to watch a previously-recorded program while simultaneously recording a new program.

The set-top box arrangement of FIG. 2 and the digital video recorder set-top box arrangement of FIG. 3 are merely illustrative. Other arrangements may be used if desired. For example, user television equipment may be based on a WebTV box, a personal computer television (PC/TV), or any other suitable television equipment arrangement. If desired, the functions of components such as set-top box 60, digital video recorder 66, a WebTV box, or PC/TV or the like may be integrated into a television or personal computer or other suitable device.

Figure 4:
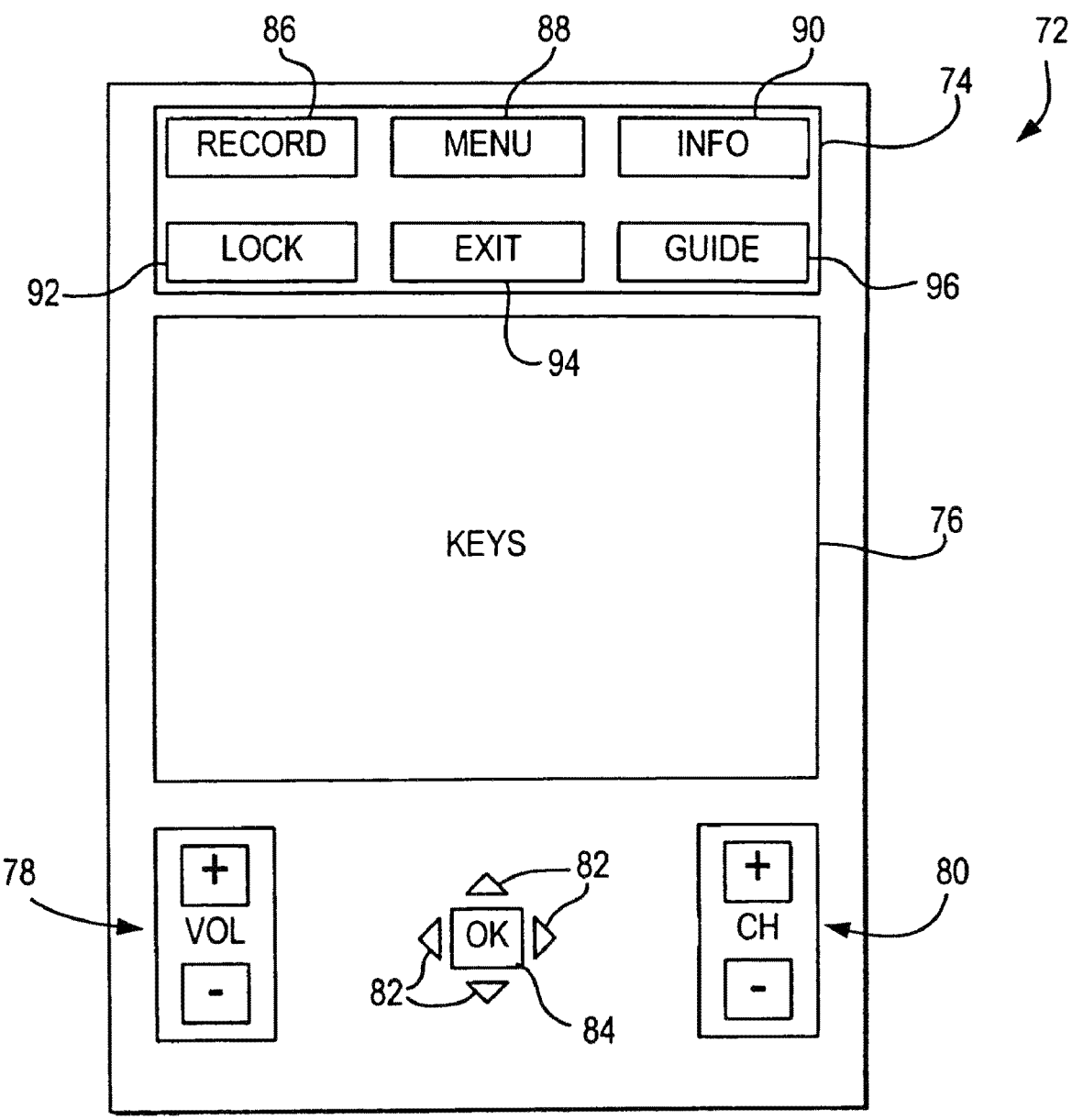
FIG. 4 is a diagram of an illustrative remote control in accordance with the present invention.

An illustrative remote control 72 for operating user television equipment 20 (or suitable user computer equipment 22) is shown in FIG. 4. Remote control 72 may have function keys 74 and other keys 76 such as keypad keys, power on/off keys, pause, stop, fast-forward and reverse keys, and any other suitable keys. Volume up and down keys 78 may be used for adjusting the volume of the audio portion of a video. Channel up and down keys 80 may be used to change television channels and to access content on virtual channels. Cursor keys 82 may be used to navigate on-screen menus. For example, cursor keys 82 may be used to position an on-screen cursor, indicator, or highlight (sometimes all generically referred to herein as a highlight or highlight region) to indicate interest in a particular option or other item on a screen displayed by the interactive television application.

An OK key 84 (sometimes called a select or enter key) may be used to select on-screen options that the user has highlighted.

Keys 74 may include a record key 86 for initiating recordings. Menu button 88 may be used to direct the interactive television application to display a menu on the user's display screen (e.g., on television 64 or 68 or on a suitable monitor or computer display). Info button 90 may be used to direct the interactive television application to display an information display screen. If the user has highlighted a particular program listing, for example, pressing the info button 90 may direct the interactive television application to provide additional program schedule information related to that program listing (e.g., a program summary, actor information, and any other suitable program schedule information).

Lock button 92 may be used to modify access privileges. For example, a parent may use lock button 92 or on-screen options to establish parental control settings for the interactive television application. The parental control settings may be time-based settings (e.g., to prevent a child from watching television during a particular time block such as from 3:00 PM to 5:00 PM). The parental control settings may also be used to block programming based on rating, channel, program title, or any other suitable criteria. A locked or blocked program is typically not viewable until the interactive television application is provided with a suitable personal identification number (PIN). Once this PIN has been entered, the interactive television program will unlock the user's equipment and allow the locked content to be accessed.

Exit button 94 may be used to exit the interactive television application or to exit a portion of the interactive television application. Guide button 96 may be used to invoke the interactive television program guide.

The keys shown in FIG. 4 are merely illustrative. Other keys or buttons may be provided if desired. For example, a music button may be used to access music with the interactive television application. An edit button may be used to edit stored content (e.g., to remove commercials, remove portions of a video, or edit any other suitable content). Alphanumeric buttons may be used to enter alphanumeric characters. A last or back button may be used to browse backward in the interactive television application (e.g., to return to a previous channel or display screen). Video recorder function buttons such as a play button, pause button, stop button, rewind button, fast-forward button, and record button, may be used to control video recorder functions (local or network-based) in system 10. A help key may be used to invoke help functions such as context-sensitive on-screen help.

Figure 5:
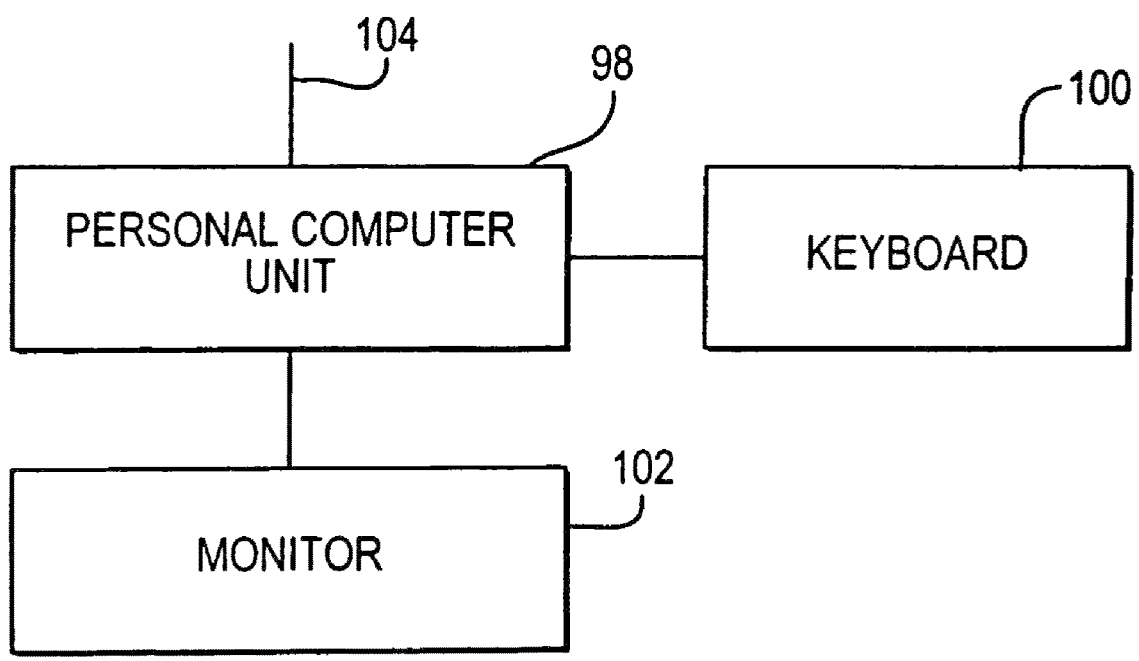
FIG. 5 is a diagram of illustrative user computer equipment in accordance with the present invention.

Illustrative user computer equipment 22 is shown in FIG. 5. In the arrangement of FIG. 5, personal computer 98 may be controlled by the user using keyboard 100 or other suitable user input device, such as a trackball, mouse, touch pad, touch screen, voice recognition system, a remote control such as remote control 72 of FIG. 4, or any other suitable user input device. Video content such as television programming and interactive television application display screens may be displayed on monitor 102. Television programming, video-on-demand content, video recordings played back from a network-based video recorder, and other information may be received from paths 28 and 48 (FIG. 1) using input/output 104. The user may also send commands and other information used during interactions with the interactive television application and system 10 over input/output line 104.

Personal computer unit 98 may contain a television or video card such as television tuner card for decoding analog and digital television channels and for handling streaming video content. Multiple video cards (e.g., tuner cards) may be provided if desired. An illustrative television tuner card that may be used may contain an analog television tuner for tuning to a given analog channel and digital decoding circuitry for filtering out a desired digital television or music channel from a packetized digital data stream. Any suitable card or components in computer unit 98 may be used to handle video and other content delivered via input/output line 104 if desired.

Personal computer unit 98 may contain one or more processors (e.g., microprocessors) that are used to run the interactive television application or a portion of the interactive television application.

Storage in personal computer unit 98 such as a hard drive, DVD drive, CD drive, or other suitable storage device or devices may be used to store video and other content. For example, the interactive television application and personal computer unit 98 may use this storage to provide the functions of a personal video recorder.

User equipment 18 such as user television equipment 20 and user computer equipment 22 may be used with network equipment such as server 56, server 36, and equipment at service providers such as service provider 50 of FIG. 1 to provide network-based video recording functions. Video recording functions may be provided by storing copies of television programs and other video content on a remote server (e.g., server 56 or server 36 of FIG. 1) or other network-based equipment such as equipment at a service provider such as service provider 50.

Video recordings may be made in response to user commands that are entered at user equipment 18. In a personal video recorder arrangement, the interactive television application may be used to record video locally on user equipment 18 in response to the user commands. In a network-based video recorder arrangement, the interactive television application may be used to record video or to make virtual recordings on network equipment such as server 36, 56, or equipment at service provider 50 in response to the user commands. The user commands may be provided to the network equipment over the communications paths shown in FIG. 1. The personal video recorder arrangement and the network-based video recorder arrangement can support functions such as fast-forward, rewind, pause, play, and record.

To avoid unnecessary duplication in a network-based video recorder environment, the system 10 may provide network-based video recording capabilities by using virtual copies or recordings. With this approach, each user may be provided with a personal area on the network that contains a list of that user's recordings. The video content need only be stored once (or a relatively small number of times) on the network equipment, even though a large number of users may have that video content listed as one of their recordings in their network-based video recorder personal area.

The user television equipment and user computer equipment arrangements described above are merely illustrative. A more generalized embodiment of illustrative user equipment is shown in FIG. 6.

Figure 6:
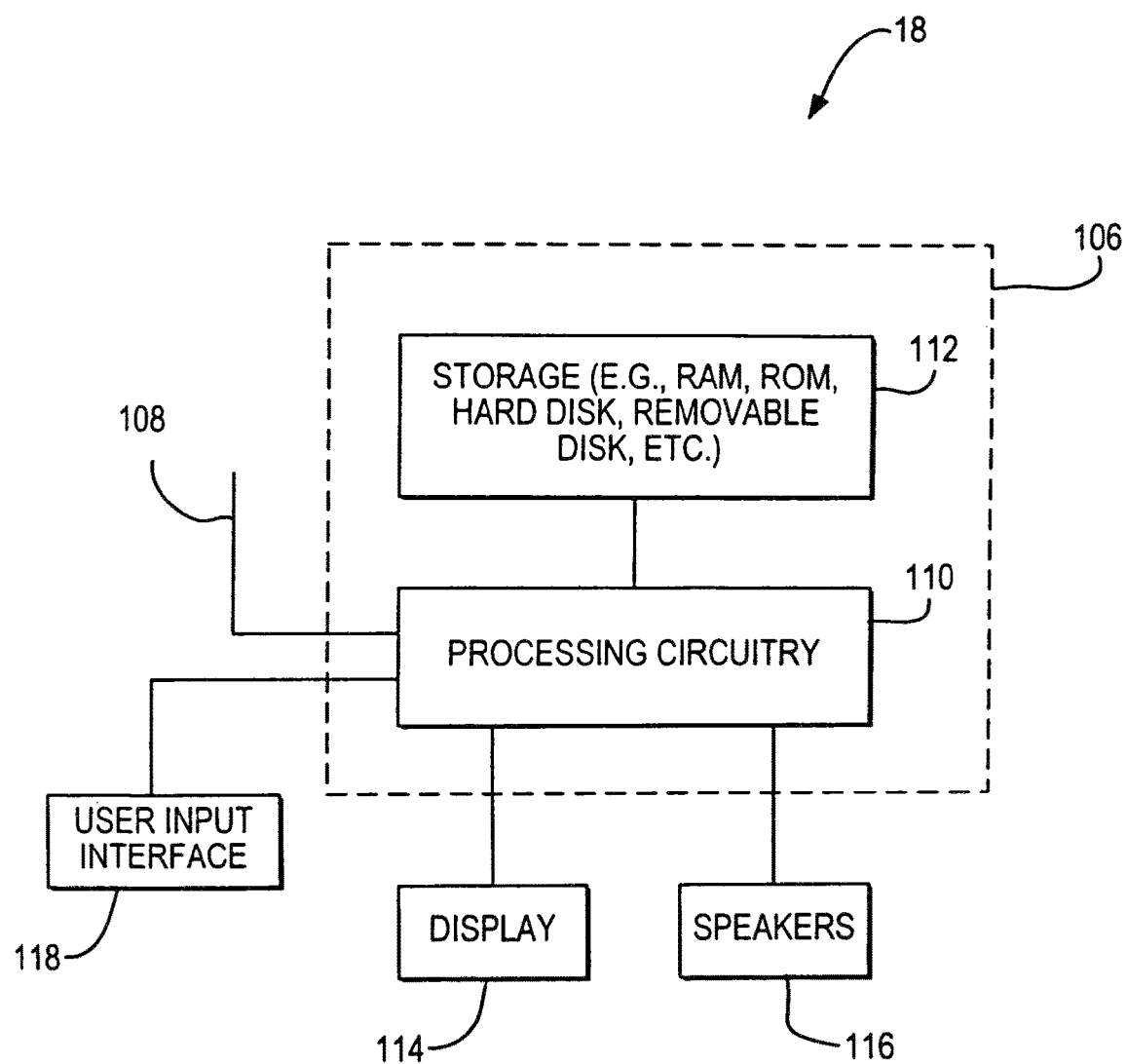
FIG. 6 is a generalized diagram of illustrative user equipment in accordance with the present invention.

As shown in FIG. 6, control circuitry 106 is connected to input/output 108. Input/output 108 may be connected to one or more communications paths such as paths 26, 27, 28, 42, 46, and 48 of FIG. 1. Television and music programming may be received via input/output 108 (e.g., from programming sources 12, servers or other equipment such as server 36, service providers such as service provider 50, and television distribution facility 14). Program schedule information for an interactive television program guide may be received from data source 30 via input/output 108. Input/output 108 may also be used to receive information from data source 30 for other interactive television applications. The user may use control circuitry 106 to send commands, requests, and other suitable information using input/output 108.

Control circuitry 106 may be based on any suitable processing circuitry 110 such as processing circuitry based on one or more microprocessors, microcontrollers, digital signal processors, programmable logic devices, or any other suitable processing circuitry. Memory (e.g., random-access memory and read-only memory), hard drives, DVD drives, CD drives, or any other suitable memory or storage devices may be provided as storage 112 that is part of control circuitry 106. Tuning circuitry such as one or more analog tuners, one or more MPEG-2 decoders or other digital video circuitry, or any other suitable tuning or video circuits or combinations of such circuits may also be included as part of circuitry 106. Encoding circuitry (e.g., for converting over-the-air or cable analog signals to MPEG signals for storage) may also be provided. The tuning and encoding circuitry may be used by user equipment 18 to receive and display or play or record a particular television or music channel or other desired audio and video content (e.g., video-on-demand content or requested network-based or local video recorder playback). Television programming and other video and on-screen options and information may be displayed on display 114. Display 114 may be a monitor, a television, or any other suitable equipment for displaying visual images. Speakers 116 may be provided as part of a television or may be stand-alone units. Digital music and the audio component of videos displayed on display 114 may be played through speakers 116.

A user may control the control circuitry 106 using user input interface 118. User input interface 118 may be any suitable user interface, such as a mouse, trackball, keypad, keyboard, touch screen, touch pad, voice recognition interface, remote control, or any other suitable user input interface.

An interactive television program guide having various interactive television program guide interface screens may be provided to assist a user in selecting television programs. Examples of the various interactive television program guide interface screens are described, for example, in Ellis U.S. patent application Ser. No. 10/306,175, filed Nov. 25, 2002, which is hereby incorporated by reference herein in its entirety.

As the number of available television programs grows, it becomes increasingly more confusing and burdensome for a user to select television programs that are of interest to the user. One approach to mitigate this problem is for an interactive television program guide application to suggest television programs to a user that may be of interest. For example, the interactive television program guide application may suggest television programs to the user based on the user's previous television viewing habits. The interactive television program guide application may derive the user's viewing habits by, for example, identifying and categorizing those television programs towards which the user has shown interest.

In some embodiments of the present invention, the interactive television program guide application may query the user as to the user's interests in television programs by using questions formulated based on those television programs towards which the user has shown interest. It will be understood that the term "questions" is not limited to textual queries but may include any suitable types of questions, prompts, options, or any other suitable tool for soliciting user responses. As an example, the interactive television program guide application may query the user regarding the user's preferences towards various actors in a television program using checkboxes. As another example, the interactive television program guide application may prompt the user to add a television program to a favorites list using a user-selectable button. As another example, the interactive television program guide application may provide an opportunity for the user to record a television program using, for example, a personal video recorder (PVR). As yet another example, the interactive television program guide application may prompt the user to schedule a television program for recording to a PVR by, for example, allowing the user to add the television program to a recording schedule. The interactive television program guide application may use various other suitable questions to automatically query the user regarding the user's interest. Some suitable approaches will be discussed in more detail below.

In one suitable approach, in response to determining that the user has shown interest towards a particular television program, the interactive television program guide application may formulate questions based on various attributes of the television program. These questions may then be displayed to the user by the interactive television program guide application at a suitable time. The suitable time for displaying these formulated question may be automatically determined by the interactive television program guide application or may be determined by the user. In some embodiments of the present invention, the interactive television program guide application may allow the user to initiate displaying of formulated questions by, for example, pressing a suitable button on a remote control (e.g., remote control 74 of FIG. 4). In some embodiments of the present invention, the interactive television program guide application may allow the user to specify, for example, during setup, suitable times for the interactive television program guide application to present formulated questions to the user.

Once the interactive television program guide application gathers responses to these questions, it may subsequently use the responses to identify television programs that are likely to be of interest to the user. Ultimately, these identified television programs may be recommended or otherwise displayed to the user as suggestions by the interactive television program guide application. The interactive television program guide application may automatically determine a suitable time for suggesting these television program to the user or the interactive television program guide application may allow the user to request for such suggestions. As an example, the interactive television program guide application may allow the user to request for suggestions by, for example, pressing a suitable button on a remote control (e.g., remote control 74 of FIG. 4). In some embodiments of the present invention, the interactive television program guide application may allow the user to specify, for example, during setup, suitable times for the interactive television program guide application to suggest television programs to the user.

Figure 7:
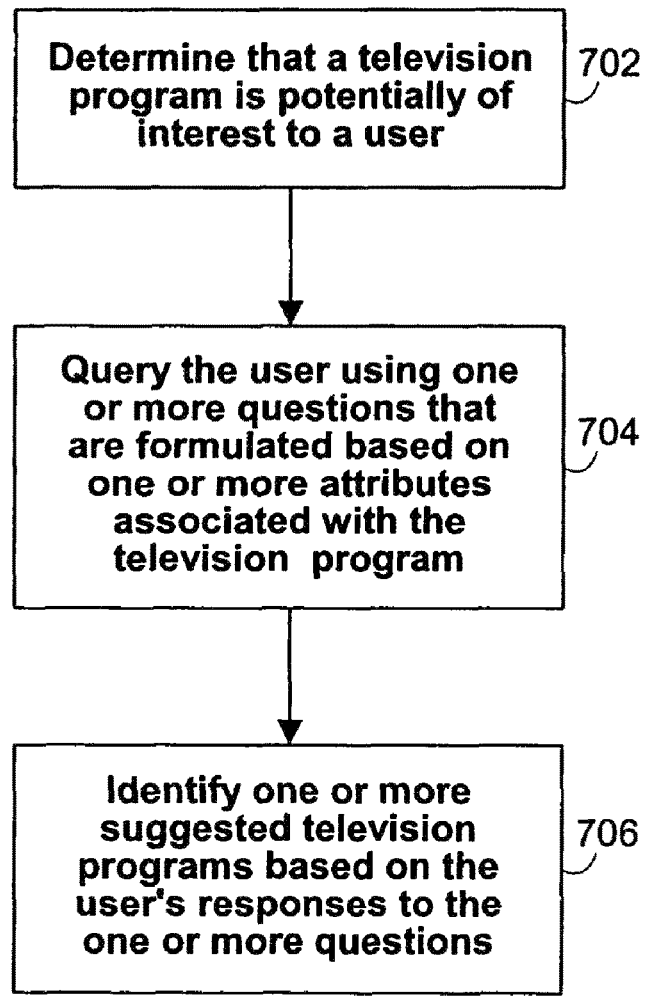
FIG. 7 is a flowchart of illustrative steps involved in suggesting television programs to a user in accordance with the present invention.

FIG. 7 shows a general flowchart of illustrative steps involved in identifying television programs to suggest to the user based on the user's responses to tailored questions in accordance with some embodiments of the present invention.

At step 702, the interactive television program guide application determines that a television program is potentially of interest to a user. The interactive television program guide application may use various suitable approaches to determine potential television programs of interest. Some examples of suitable approaches will be described in detail below.

At step 704, the interactive television program guide application queries the user regarding the user's interest in television programs using one or more tailored questions. The questions are formulated based on one or more attributes associated with the television program that has been identified as a potential television program of interest by the interactive television program guide application at step 702.

The types of information that may be provided by the attributes associated with a television program may include, for example, category, type, genre, any other suitable information associated with the television program, or any combination thereof. In some embodiments of the present invention, additional attributes associated with, for example, a particular category, type, or genre of television program may also be identified. As an example, for a television program in the movie category, the interactive television program guide application may have access to additional attributes such as the cast members, director, producer, storyline, time period, or any other suitable attribute specific to a movie. In some embodiments of the present invention, the interactive television program guide application may also have access to relationship attributes that describe the television program's relationship with a past program, a future program, a related serial or any other suitable television programming. For example, in connection with a past television program, the interactive television program guide application may have access to relationship attributes that reveal any sequels, episodes in a serial, or any other suitable related television programs.

Once the interactive television program guide application gathers the user's responses to the questions, the interactive television program guide application then identifies one or more television programs to suggest to the user at step 706 that are based on the user's responses.

Detailed descriptions and examples of the various steps involved in identifying and suggesting television programs to a user based on queries using tailored questions will be discussed fully below.

The interactive television program guide application may use various methods to identify those television programs toward which the user has shown interest. For example, the interactive television program guide application may take note of the various television programs that the user has watched. This approach, however, may prove to be inaccurate in evaluating user interest due to the large number of television programs that the user browses that are not necessarily of interest to the user. To improve upon this approach, the interactive television program guide application may identify a smaller set of those television programs to which the user has shown more substantial interest.

In some embodiments of the present invention, the interactive television program guide application may determine whether the user is casually channel surfing past a television program or whether the television program has actually captured the user's interest in a more significant manner. The interactive television program guide application may make such a determination, for example, by monitoring the amount of time that the user spends watching the television program.

As an example, the interactive television program guide application may monitor the amount of time that the user spends watching a particular program in one continuous time period. The interactive television program guide application may then, for example, mark the television program that the user watches for a continuous period of time that is greater than a predetermined period of time as a potential program of interest. The interactive television program guide application may mark a television program as a potential television program of interest by, for example, inserting a flag into the data associated with the television program in a database (e.g., program listing information stored in a database), encoding such information into the datastream associated with the television program, storing a listing of the television program in a potential interest list, or using any other suitable approach to mark the television program so that the interactive television program guide application recognizes it as a potential television program of interest.

As another example, the interactive television program guide application may monitor the cumulative time that the user spends watching a particular television program. The interactive television program guide application may compute the cumulative time by, for example, adding together the time periods that the user has spent watching the particular television program during a time period within which the user has also watched other television programs (as opposed to continuously watching the particular television program, as described above). If the cumulative time exceeds a predetermined period of time, the interactive television program guide application may mark the television program as a potential program of interest.

As another example, the interactive television program guide application may monitor when the user stops watching a television program (e.g., when a commercial begins) and whether the user returns to watching the television program (e.g., after browsing through other programs). If the user returns to watching the television program, the interactive television program guide application may mark the television program as a potential television program of interest. In some embodiments of the present invention, the interactive television program guide application may treat turning off the television as an interruption that is similar to the commercial example described above. In response to a user turning the television back on, the interactive television program guide application may determine the length of time that the television had been turned off. If the time period that the television had been off is short, for example, when compared to a predetermined period of time, the interactive television program guide application may determine whether the user has returned to watching the television program that the user had been watching before turning off the television. If the user has returned to watching the same television program, the interactive television program guide may mark the television program as a potential television program of interest.

The examples described above are merely illustrative of the type of approaches that may be used to identify potential television programs of interest. Any other suitable approaches may be used.

Figure 8:
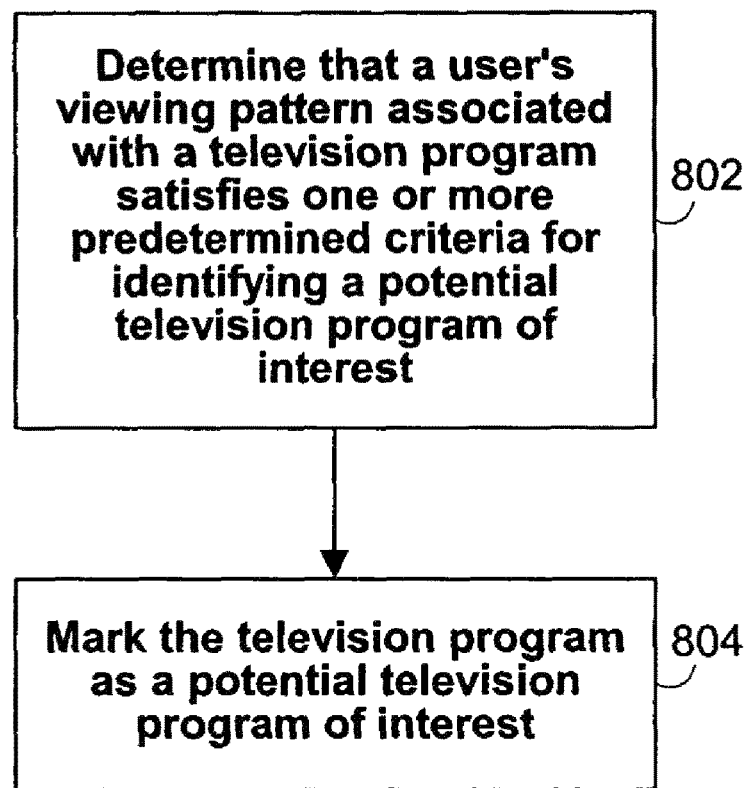
FIG. 8 is a flowchart of illustrative steps involved in identifying a potential television program of interest in accordance with the present invention.

FIG. 8 is a flowchart of illustrative steps involved in identifying a potential television program of interest in accordance with some embodiments of the present invention.

At step 802, the interactive television program guide application determines whether the user's viewing pattern associated with a television program (e.g., continuous viewing period, cumulative viewing period, or any other suitable viewing pattern indicator) satisfies one or more predetermined criteria for identifying a potential program of interest.

If the user's viewing pattern satisfies one or more predetermined criteria, the interactive television program guide application then marks the television program as a potential television program of interest at step 804.

Once the interactive television program guide application determines that the user has shown interest towards a particular television program using any suitable approach, the interactive television program guide application may use various characteristics of the television program to assist in identifying other television programs that may be of interest to the user.

In some embodiments of the present invention, the interactive television program guide application may formulate a series of questions in order to, for example, query the user regarding characteristics of the particular television program that may have made it interesting to the user. These questions may, for example, allow the user to add the television program or related television programs to the user's favorites list (e.g., when the television program is a part of a series of programs), allow the user to set reminders for the television program or related television programs, confirm the user's interest in various attributes associated with the television program (e.g., interest in a particular actor) for use in making future programming recommendations to the user, or obtain any other suitable information for identifying television programs of potential interest to the user.

The interactive television program guide application may formulate the questions displayed to the user by, for example, basing the questions on various attributes associated with the particular television program as described above. The various attributes associated with the particular television program may be predetermined by, for example, the distributor of the television program, content creator, or any other suitable source of the television program. The attributes associated with the television programs may be transmitted to the user equipment, for example, along with other interactive television program guide information.

Based on these predetermined attributes, when the interactive television program guide application identifies a potential television program of interest, the interactive television program guide application may formulate tailored questions to query the user regarding the user's interest in what have been identified as related television programs.

As an example, the interactive television program guide application may determine from an attribute associated with a potential television program of interest that the television program is an episode of a serial. Upon making such a determination, the interactive television program guide application may formulate a question that allows the user to add the serial to the user's favorite list. As another example, the interactive television program guide application may determine from attributes associated with a potential television program of interest that the program is a dramatic movie starring a particular actor. The interactive television program guide application may then formulate a question to query the user regarding the user's preference for other television programs starring the same actor or for other dramatic movies.

In some embodiments of the present invention, the interactive television program guide application may omit certain types of questions based on attributes associated with a television program. For example, upon determining that an attribute associated with television program reveals that the television program is a dramatic movie having no related television programs (e.g., sequels, serials, or any other suitable related television program), the interactive television program guide application may avoid the formulation of a question that prompts the user to add the movie to the user's favorites list. Based on this attribute, the interactive television program guide application may also determine that the user is not likely to want to view the same movie more than once, and may therefore avoid prompting the user to set a reminder for future occurrences of the movie.

It will be understood that while the interactive television program guide application may not display certain questions to the user based on attributes associated with a particular television program, the interactive television program guide application may nonetheless provide the user with the opportunity to request such options. For example, the user may request to add a movie to favorites, for example, by pressing a menu button on the user's remote control (e.g., remote control 72 of FIG. 4) to access favorites options provided by the interactive television program guide or using any other suitable request method.

Figure 9:
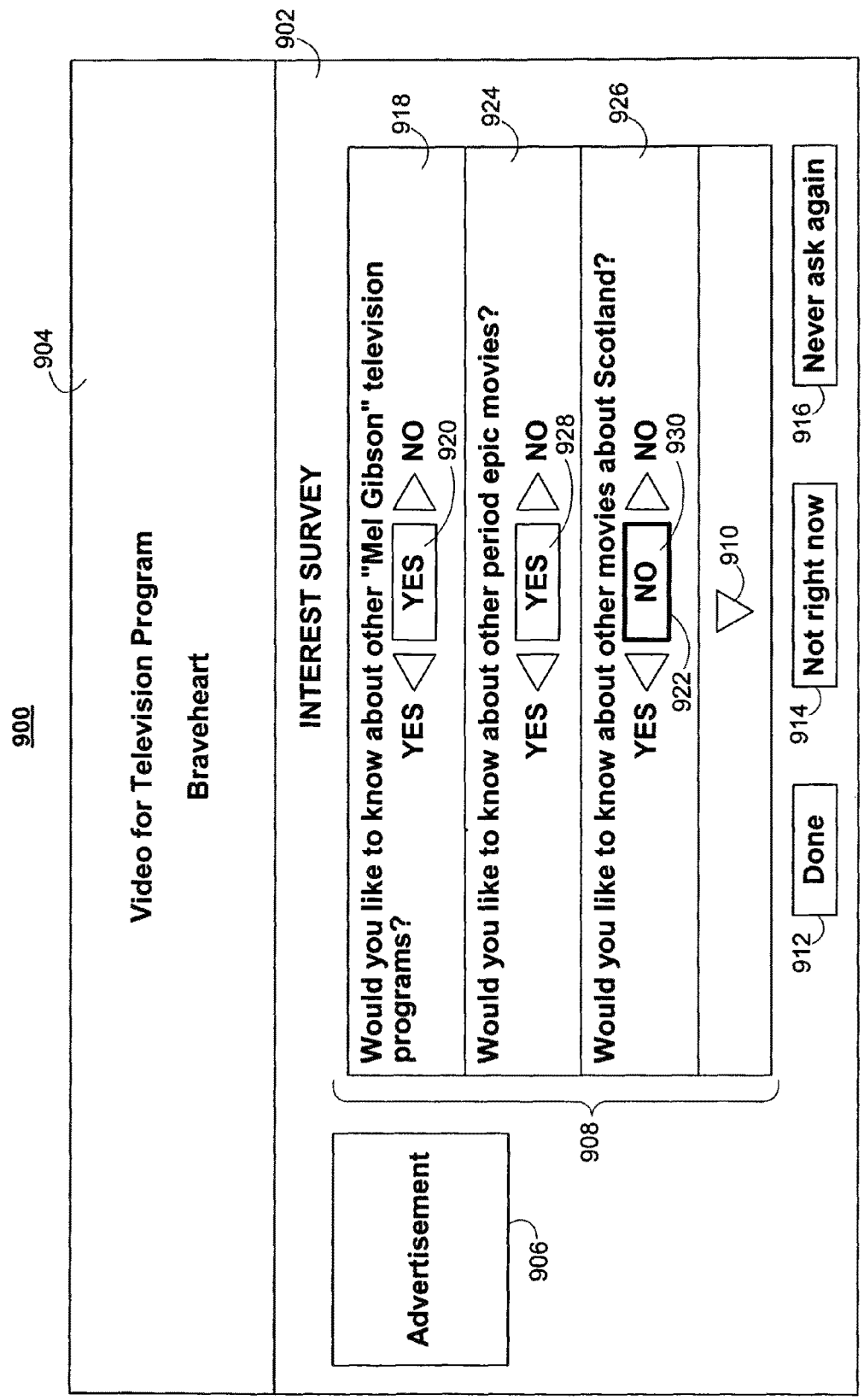
FIG. 9 shows an illustrative television screen containing an interest survey window associated with a movie in accordance with the present invention.
Figure 10:
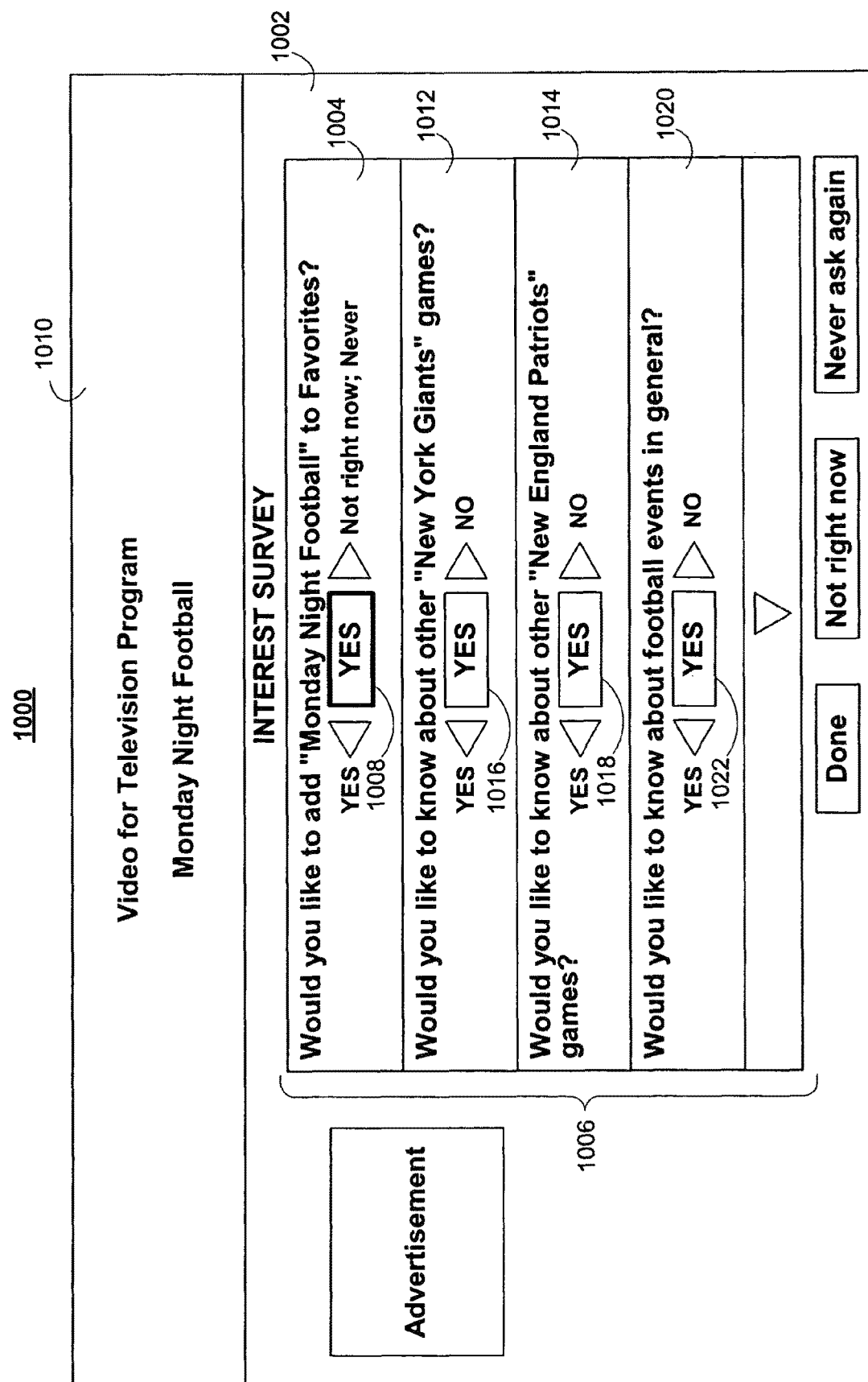
FIG. 10 shows an illustrative television screen containing an interest survey window associated with a sporting event in accordance with the present invention.
Figure 11:
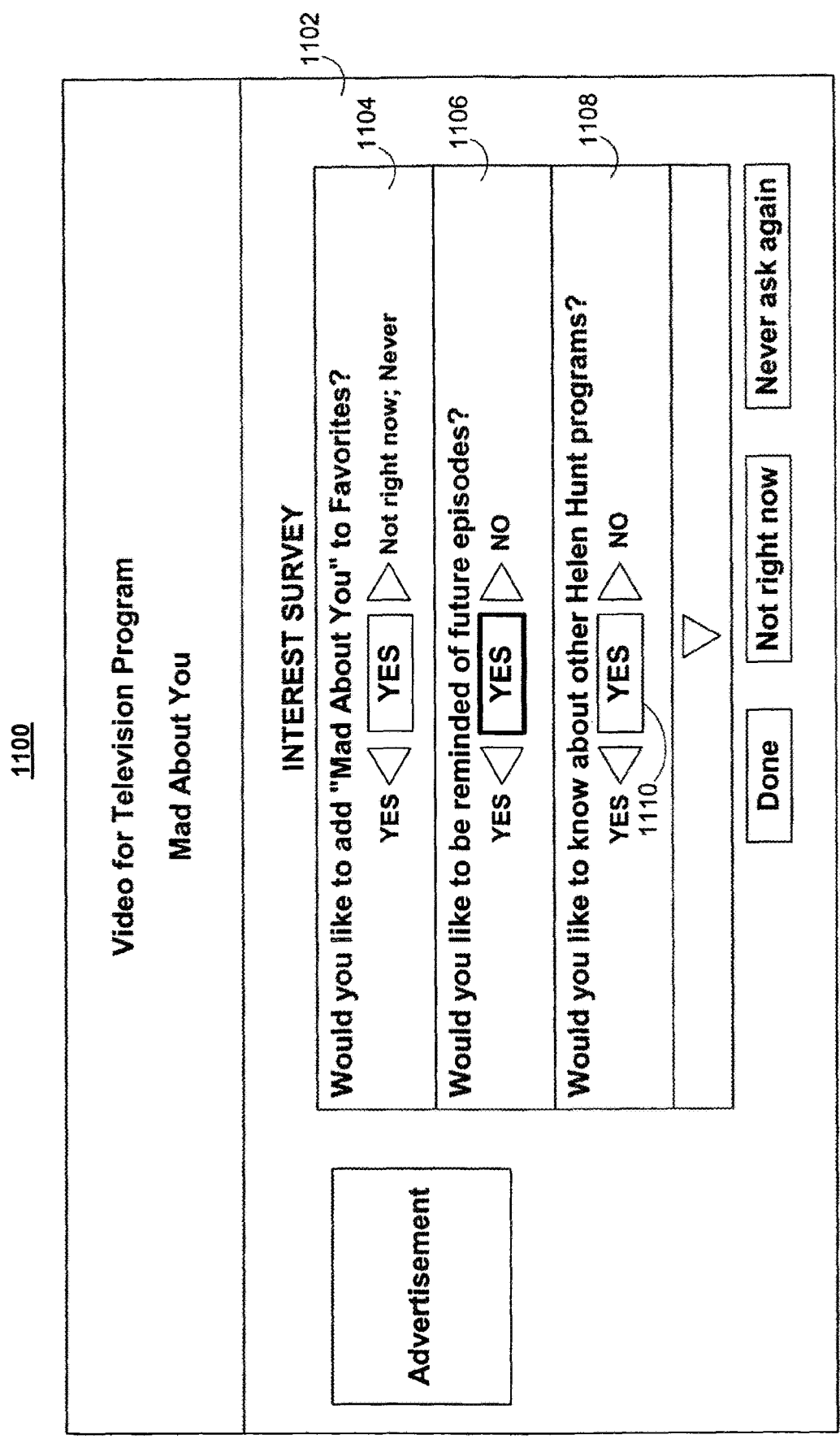
FIG. 11 shows an illustrative television screen containing an interest survey window associated with an episode of a serial in accordance with the present invention.

FIGS. 9 to 11 demonstrate various questions that may be displayed to a user by the interactive television program guide application based on attributes that are associated with a potential television program of interest. While the examples of FIGS. 9 to 11 are shown as television screens in accordance with the present invention, it will be understood that various other types of screens, such as computer screens, screens of personal digital devices, or any other suitable display arrangement, may be used.

FIG. 9 shows an illustrative television screen 900 containing an interest survey window 902 associated with a movie in accordance with some embodiments of the present invention. Television screen 900 containing interest survey window 902 may be displayed to the user, for example, in response to the interactive television program guide application determining that the user has demonstrated interest in the movie "Braveheart" (e.g., by watching "Braveheart" for a continuous period of time that is greater than a predetermined period of time). The interactive television program guide application may continue to display video of the movie in video window 904, occupying the top portion of television screen 900. The interactive television program guide application may display one or more questions formulated based on attributes associated with the movie in interest survey window 902, which occupies the bottom portion of television screen 900. The interactive television program guide application may display interest survey window 902 as an overlay on top of video window 904 or in any other suitable arrangement.

Interest survey window 902 may include, for example, an advertisement 906, a list 908 of one or more questions formulated based on various attributes associated with the television program displayed in video window 904, directional key 910 for accessing additional questions, buttons 912, 914, and 916 for submitting, deferring, and skipping selections respectively, and any other suitable features. If the user selects button 912, the interactive television program guide application may gather the user's responses to the questions for use in identifying television programs to suggest to the user. If the user selects button 914, the interactive television program guide application may display interest survey window 902 or any other suitable interface having the same questions at a later time. If the user selects button 916, the interactive television program guide application may remove interest survey window 902 from television screen 900 and refrain from querying the user with the same questions again. In some embodiments of the present invention, if the user closes interest survey window 902 without answering any questions, the interactive television program guide application may display interest survey window 902 or any other suitable interface having the same questions to the user at a later time.

In this particular example, the interactive television program guide application has omitted any questions regarding saving the movie displayed in video window 904 to the user's favorites list. This is because one or more attributes associated with "Braveheart" indicate to the interactive television program guide application that "Braveheart" is a movie having no closely related television programs.

In the example of FIG. 9, the interactive television program guide application has determined from one of the attributes associated with the movie that Mel Gibson is the starring actor in this movie. Accordingly, the interactive television program guide application provides question 918 in list 908 to allow the user to indicate an interest in other television programs starring Mel Gibson. The user may confirm such an interest, for example, by setting toggle button 920 to "yes." This may be accomplished by placing highlight region 922 on toggle button 920 and then using directional arrows on a remote control (e.g., remote control 72 of FIG. 4) to toggle to choice "yes." The interactive television program guide application also queries the user with questions 924 and 926 through which the user may confirm interests towards other attributes associated with the movie "Braveheart" (e.g., period epic, Scotland, or any other suitable attribute). The user may respond to these questions using toggle buttons 928 and 930, respectively.

Television screen 900 containing an interest survey window 902 is merely illustrative of such a display screen. Various other suitable arrangements may be used.

FIG. 10 shows another example of an illustrative television screen 1000 containing an interest survey window 1002 associated with a sporting event in accordance with some embodiments of the present invention. The interactive television program guide application may display interest survey window 1002, for example, in response to identifying "Monday Night Football" as a television program that is of interest to the user (e.g., by determining that the user has watched "Monday Night Football" for a continuous period of time that is greater than a predetermined period of time).

In the example of FIG. 10, the interactive television program guide application has determined from an attribute associated with "Monday Night Football" that it is a recurring television program. Accordingly, the interactive television program guide application has formulated and provided the user with question 1004 in the list of questions 1006 shown within interest survey window 1002 to enable the user to add "Monday Night Football" to the user's favorites list. In connection with this question, the user may select whether to add the program to the favorites list at the present time, at a later time, or never, using toggle button 1008. If the user chooses "yes," the interactive television program guide application may add the program to the user's favorite list. If the user chooses "not right now," the interactive television program guide application may query the user again at another time. If the user chooses "never," indicating the user's lack of interest in this television program, the interactive television program guide application may refrain from querying the user in the future. In some embodiments of the present invention, in response to a user response of "never," the interactive television program guide application may refrain from querying about or assign a lower priority to similar television programs in the future.

In the example of FIG. 10, the interactive television program guide application has also determined from other attributes associated with "Monday Night Football" that the game displayed for the user in video window 1010 is between the New York Giants and the New England Patriots. Based on this information, the interactive television program guide application may formulate questions 1012 and 1014 to allow the user to indicate an interest in these two teams using toggle buttons 1016 and 1018, respectively. Also in this example, the interactive television program guide application has determined based on a category attribute that "Monday Night Football" is a football event. Thus, the interactive television program guide application additionally displays question 1020 in interest survey window 1002 to query the user as to the user's interest in other football events. The user may respond to question 1020 using toggle button 1022.

Television screen 1000 containing interest survey window 1002 is merely illustrative of such a display screen. Various other suitable arrangements may be used.

FIG. 11 shows another example of an illustrative television screen 1100 containing interest survey window 1102 associated with an episode of a serial in accordance with some embodiments of the present invention. The interactive television program guide application may display interest survey window 1102, for example, in response to determining that the user has shown interest towards an episode of a serial. In this example, the interactive television program guide application has determined from attributes associated with the episode of "Mad About You" that the episode is related to one or more other episodes in a serial. In response to making such a determination, the interactive television program guide application prompts the user with questions 1104 and 1106 to allow the user to add the serial to the user's favorites list and to set reminders for future episodes of the serial, respectively.

In this example, the interactive television program guide application has also identified, through examination of the associated attributes, that the serial casts actress Helen Hunt. Accordingly, the interactive television program guide application provides the user with question 1108 regarding the user's interest in other television programs starring Helen Hunt. The user may confirm such an interest, for example, by setting toggle button 1110 to "yes."

Television screen 1100 containing interest survey window 1102 is merely illustrative of such a display screen. Various other suitable arrangements may be used.

As described above, as the user watches television, the interactive television program guide application may automatically determine if the current television program is a potential television program of interest. Once the interactive television program guide application identifies the television program as a potential television program of interest, the interactive television program guide application may formulate questions associated with the television program as the user watches the program. In some embodiments of the present invention, the interactive television program guide application may also formulate questions associated with the television program after the user has finished watching the television program. Suitable time for formulating questions associated with a television program may be automatically determined by the interactive television program guide, pre-determined by the content distributor, determined by the user (e.g., during setup), or determined using any other suitable approach. The interactive television program guide application may then display the formulated questions to the user at a suitable time. For example, the interactive television program guide application may display the questions to the user during the presentation of the television program, immediately after the presentation of the television program, during a commercial break, in response to the user switching channels, in response to the user turning on the television, or at any other suitable time. Some suitable approaches for displaying the formulated questions to the user are described in detail below.

In one suitable approach, the interactive television program guide application may display questions formulated in association with a particular television program when the user initiates interaction with the program guide during the presentation of the particular television program. The user may initiate interaction with the program guide by, for example, requesting display of the guide, changing channels, or using any other suitable approach. In another suitable approach, the interactive television program guide application may display the questions to the user in response to the user initiating interaction with the program guide within a predetermined time period after the end of the particular television program. In yet another suitable approach, the interactive television program guide application may automatically display the questions to the user at the end of the particular television program or at any other suitable time determined by the interactive television program guide application.

Figure 12:
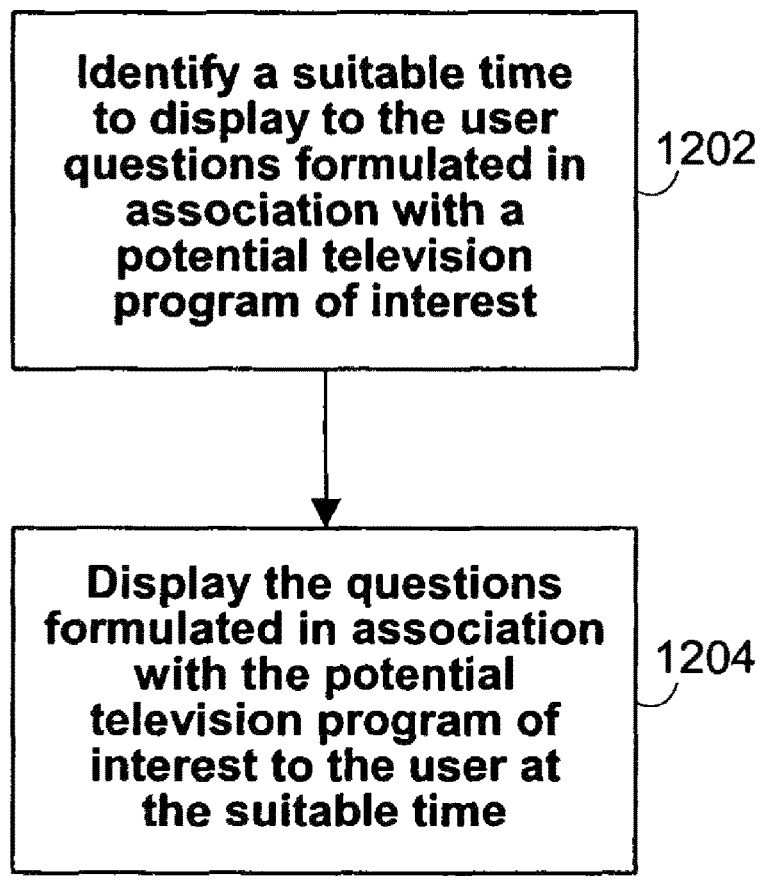
FIG. 12 is a flowchart of illustrative steps involved in identifying a suitable time for presenting to the user questions formulated in association with a potential television program of interest in accordance with the present invention.

FIG. 12 shows a flowchart of illustrative steps involved in displaying to the user at a suitable time questions formulated in association with a potential television program of interest in accordance with some embodiments of the present invention.

At step 1202, the interactive television program guide application identifies a suitable time for displaying to the user questions that have been formulated in association with a potential television program of interest using any suitable approach.

The interactive television program guide application then displays the questions formulated in association with the potential television program of interest to the user at step 1204.

Once the interactive television program guide application has gathered the user's responses to the various questions, the interactive television program guide application may assist the user in selecting television programs of interest in various ways. In some embodiments of the present invention, the interactive television program guide application, in response to the user invoking a favorites view of the guide (e.g., a program guide view containing user favorites information, including the user's favorites list), may prominently display those favorite programs that are about to start. The interactive television program guide application may also provide to the user, in the favorites view, those suggested television programs that have been identified by the interactive television program guide application. For example, the interactive television program guide application may have identified these suggested television programs by using the user's responses to questions previously displayed to the user.

FIG. 13 shows one example of an illustrative favorites screen 1300 in accordance with some embodiments of the present invention. Favorites screen 1300 may prominently display in the top portion of the screen a list 1302 of favorite programs that are about to start. The user may adjust the time frame for displaying the favorite programs using directional arrows 1304 and 1306. Alternatively, the user may use suitable directional buttons on the user's remote control (e.g., remote control 72 of FIG. 4) or any other suitable means for adjusting the time frame.

Favorites screen 1300 may also include a suggested television program list 1308. The interactive television program guide application may have identified these suggested television programs using at least partially, for example, the user's responses to questions previously displayed to the user. Suggested television program list 1308 may be sorted to prominently display those suggested television programs that are about to start (e.g., at the top of the list).

The user may access additional favorite programs and additional suggested programs by scrolling down favorites list 1302 and suggested television program list 1308 using arrows 1310 and 1312. Alternatively, the user may access complete lists of favorite programs and recommended programs by selecting "favorites list" button 1314 and "recommended" button 1316, respectively.

In some embodiments of the present invention, the interactive television program guide application may include in favorites screen 1300 options to provide the user with preview information on interesting upcoming television programs. In this particular example, favorites screen 1300 includes "coming up today" button 1318 and "coming up this week" button 1320 to provide the user with such information. In response to a user selection of "coming up today" button 1318, for example, the interactive television program guide application may refresh favorites screen 1300 to display to the user a list of television programs coming up on the present day that are in the user's favorites list, having been identified as suggested television programs, or both. Similarly, in response to a user selection of "coming up this week" button 1320, for example, the interactive television program guide application may refresh favorites screen 1300 to display to the user a list of television programs coming up in the current week.

Figure 14:
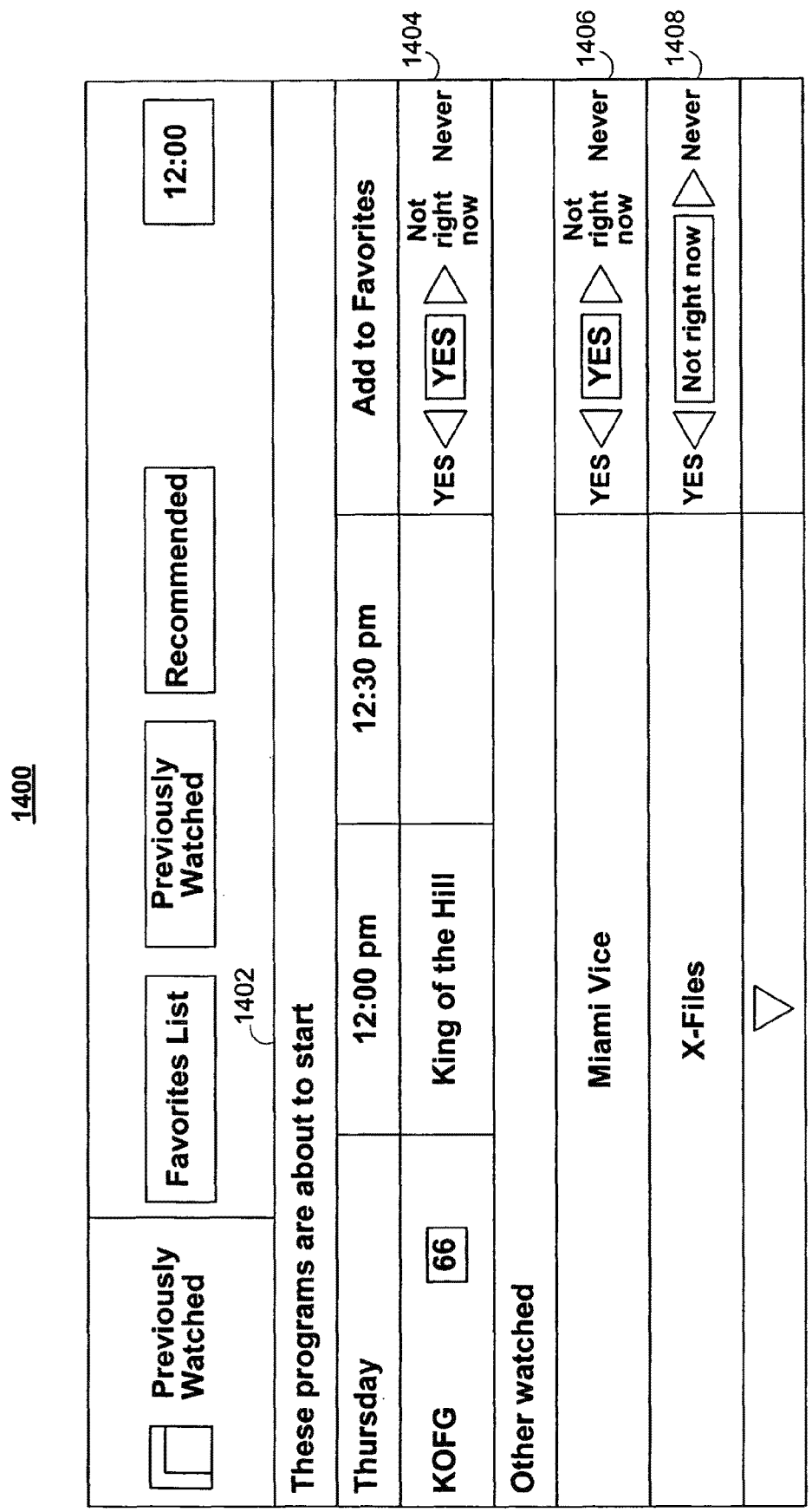
FIG. 14 shows an illustrative previously watched list screen in accordance with the present invention.

In this particular example, a "previously watched" button 1322 is provided on favorites screen 1300. In response to the user selecting "previously watched" button 1322, the interactive television program guide application may display to the user a previously watched screen 1400, as shown in FIG. 14, in accordance with some embodiments of the present invention. Previously watched screen 1400 may be similar in layout to favorites screen 1300 of FIG. 13. However, in place of the user's favorites list, the interactive television program guide application may display a previously watched list 1402 of those television programs that the user has shown interest towards, but has not yet added to the user's favorite list (e.g., the user has previously selected "not right now" when asked whether the user would like to add the program to favorites).

The interactive television program guide application may prominently display on previously watched screen 1400 those television programs that are about to start. In this particular example, the interactive television program guide application provides options 1404, 1406, and 1408 for the user to select whether to add any of these previously watched programs to the user's favorites list. If the user again chooses "not right now," the interactive television program guide application may keep the television program on previously watched list 1402 to be displayed to the user at a later time. However, if the user chooses "never," or if the user ignores the television program on previously watched list 1402 for a predetermined period of time, the interactive television program guide application may remove the television program from previously watched list 1402.

Previously watched screen 1402 is merely illustrative of such a display screen. Various other suitable arrangements may be used.

In some embodiments of the present invention, the interactive television program guide application may bring to the user's attention favorite and suggested television programs that are scheduled to air in or near a time frame. The time frame may be a time frame within which the user is currently browsing, for example, in the interactive television program guide listings.

Figure 15:
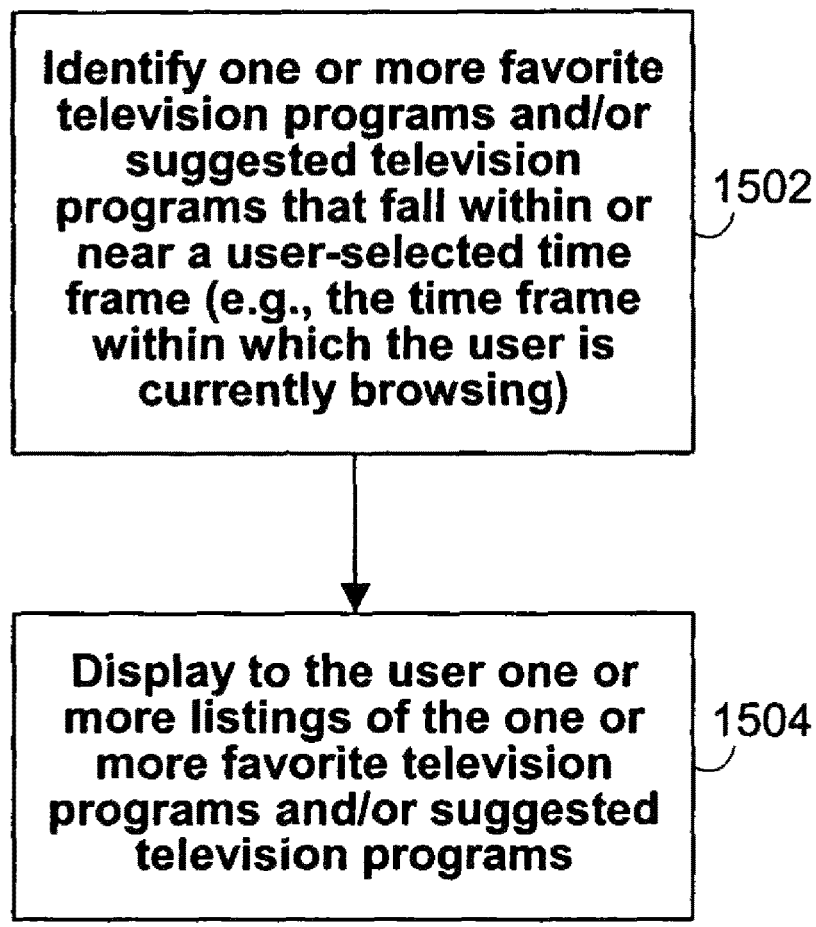
FIG. 15 is a flowchart of illustrative steps involved in alerting the user as to listings of favorite television programs, suggested television programs, or both, within a time frame that the user is currently browsing in accordance with the present invention.

FIG. 15 is a flowchart of illustrative steps involved in alerting the user to listings of favorite television programs, suggested television programs, or both, that are within or near the time frame that the user is currently browsing in the program guide in accordance with some embodiments of the present invention.

At step 1502, the interactive television program guide application identifies one or more listings of favorites television programs, suggested television programs, or both, that are within or near a user-selected time frame. For example, the user-selected time frame may be the time frame that the user is currently browsing (e.g., in a program guide). The interactive television program guide application then alerts the user to the one or more favorite television programs, suggested television programs, or both using, for example, a suggestion overlay such as suggestion overlay 1600 of FIG. 16 (step 1504).

FIG. 16 shows a suggestion overlay 1600 that may be displayed by the interactive television program guide application to alert the user of favorite programs and suggested programs that are within or near a user-selected time frame in accordance with some embodiments of the present invention. In this particular example, program listings window 1602 shows that the user is currently browsing program listings in the 12:00-12:30 pm time frame on Thursday. In response to determining that favorite programs as well as suggested programs are available within or near this time frame, the interactive television program guide application displays suggestion overlay 1600 containing a list of these television programs. The interactive television program guide application may allow the user to close suggestion overlay 1600 using close button 1604. In some embodiments of the present invention, the interactive television program guide application may allow a user to prevent the interactive television program guide application from displaying suggestion overlay 1600, any other pop-up windows (e.g., containing questions associated with a television program), or any combination of overlays and windows thereof. For example, the interactive television program guide application may provide an option for the user to disable displaying of these overlays and pop-up windows during set-up.

Suggestion overlay 1600 is merely illustrative of such a display screen. Various other suitable arrangements may be used.

The foregoing is merely illustrative of the principles of this invention and various modifications can be made by those skilled in the art without departing from the scope and spirit of the invention.

What is claimed is:

1. A method comprising:
using one or more servers:
determining that a first content having a first set of attributes is potentially of interest to a user;
providing to user equipment data indicative of the first content as being of potential interest to the user;
causing to be generated for display an indication of the first content as being of potential interest to the user;
causing to be generated for display at the user equipment an option to indicate whether the user is interested in the first content;
receiving, from the user equipment, an input indicating that the user requested to remove the indication of the first content as being of potential interest to the user; and
in response to receiving the input:
cross-referencing, using control circuitry, an attribute of the first set of attributes of the first content with a database of a plurality of contents to identify a second content associated with the attribute, the second content having a second set of attributes,
causing, using the control circuitry, to be reduced a likelihood that data indicative of the second content as being of potential interest to the user is provided to the user in the future, and
causing the indication of the first content as being of potential interest to the user to be removed.

2. The method of claim 1, further comprising causing to be provided on user equipment a listing of the first content.

3. The method of claim 1, further comprising causing to be provided an option selectable by the user to indicate removal of the data indicative of the first content.

4. The method of claim 3, wherein receiving the indication that the user requested to remove the data indicative of the first content comprises receiving an indication that the user selected the option.

5. The method of claim 1, wherein causing to be reduced the likelihood that data indicative of the second content as being of potential interest to the user is provided to the user in the future comprises preventing data indicative of the second content as being of potential interest to the user from being provided.

6. The method of claim 1, further comprising:
identifying a time to display the data indicative of the first content; and
causing to be displayed the data indicative of the first content at the time.

7. The method of claim 1, wherein determining that the first content is potentially of interest to the user is based on a cumulative time that the user spends watching the first content.

8. The method of claim 1, further comprising, in response to receiving the indication, reducing the likelihood that data indicative of programs similar to the second content as being of potential interest to the user is provided.

9. A system comprising:
at one or more servers comprising control circuitry, the control circuitry configured to:
determine that a first content having a first set of attributes is potentially of interest to a user;
provide to user equipment data indicative of the first content as being of potential interest to the user;
cause to be generated for display at the user equipment an indication of the first content as being of potential interest to the user;

cause to be generated for display at the user equipment an option to indicate whether the user is interested in the first content;
receive, from the user equipment, an input indicating that the user requested to remove the indication of the first content as being of potential interest to the user; and
in response to receiving the input:
cross-reference an attribute of the first set of attributes of the first content with a database of a plurality of contents to identify a second content associated with the attribute, the second content having a second set of attributes,
cause to be reduced a likelihood that data indicative of the second content as being of potential interest to the user is provided to the user in the future, and
cause the indication of the first content as being of potential interest to the user to be removed.

10. The system of claim 9, wherein the control circuitry is further configured to cause to be provided on user equipment a listing of the first content.

11. The system of claim 9, wherein the control circuitry is further configured to cause to be provided an option selectable by the user to indicate removal of the data indicative of the first content.

12. The system of claim 11, wherein the control circuitry is configured to receive the indication that the user requested to remove the data indicative of the first content by receiving an indication that the user selected the option.

13. The system of claim 9, wherein the control circuitry is configured to cause to be reduced the likelihood that data indicative of the second content as being of potential interest to the user is provided to the user in the future by preventing data indicative of the second content as being of potential interest to the user from being provided.

14. The system of claim 9, wherein the control circuitry is further configured to:
identify a time to display the data indicative of the first content; and
cause to be displayed the data indicative of the first content at the time.

15. The system of claim 9, wherein the control circuitry is configured to determine that the first content is potentially of interest to the user based on a cumulative time that the user spends watching the first content.

16. The system of claim 9, wherein the control circuitry is further configured to, in response to receiving the indication, reduce the likelihood that data indicative of programs similar to the second content as being of potential interest to the user is provided.

17. A non-transitory computer-readable medium having instructions encoded thereon that when executed by control circuitry performs the method comprising:
at one or more servers:
determining that a first content having a first set of attributes is potentially of interest to a user;
providing to user equipment data indicative of the first content as being of potential interest to the user;
causing to be generated for display at the user equipment an indication of the first content as being of potential interest to the user;
causing to be generated for display at the user equipment an option to indicate whether the user is interested in the first content;
receiving, from the user equipment, an input indicating that the user requested to remove the indication of the first content as being of potential interest to the user; and
in response to receiving the input:
cross-referencing, using control circuitry, an attribute of the first set of attributes of the first content with a database of a plurality of contents to identify a second content associated with the attribute, the second content having a second set of attributes,
causing, using the control circuitry, to be reduced a likelihood that the data indicative of the second content as being of potential interest to the user is provided to the user in the future, and
causing, using the control circuitry, the indication of the first content as being of potential interest to the user to be removed.

18. The non-transitory computer-readable medium of claim 17 having instructions encoded thereon that when executed by control circuitry performs the method further comprising causing to be provided on user equipment a listing of the first content.

19. The non-transitory computer-readable medium of claim 17 having instructions encoded thereon that when executed by control circuitry performs the method further comprising causing to be provided an option selectable by the user to indicate removal of the data indicative of the first content.

20. The non-transitory computer-readable medium of claim 19, wherein receiving the indication that the user requested to remove the data indicative of the first content comprises receiving an indication that the user selected the option.

21. The non-transitory computer-readable medium of claim 17, wherein causing to be reduced the likelihood that data indicative of the second content as being of potential interest to the user is provided to the user in the future comprises preventing data indicative of the second content as being of potential interest to the user from being recommended.

22. The non-transitory computer-readable medium of claim 17 having instructions encoded thereon that when executed by control circuitry performs the method further comprising:
identifying a time to display the data indicative of the first content; and
causing to be displayed the data indicative of the first content at the time.

23. A method comprising:
at user equipment:
determining that a first content having a first set of attributes is potentially of interest to a user;
causing to be provided a listing of the first content as being of potential interest to the user;
generating for display an indication of the first content as being of potential interest to the user;
generating for display an option to indicate whether the user is interested in the second content;
receiving an input indicating that the user requested to remove the listing of the first content;
causing to be cross-referenced, using control circuitry, an attribute of the first set of attributes of the first content with a database of a plurality of contents to identify a second content associated with the attribute, the second content having a second set of attributes;

reducing, using the control circuitry, a likelihood that a listing of the second content as being of potential interest to the user is provided to the user in the future based on the user selection; and causing the indication of the first content as being of potential interest to the user to be removed.

24. The method of claim 23, wherein the database is remote from the user equipment.

25. The method of claim 23, further comprising at the user equipment causing to be provided an option selectable by the user to indicate removal of the listing.

26. The method of claim 25, wherein receiving the indication that the user requested to remove the listing comprises receiving an indication that the user selected the option.

27. The method of claim 23, wherein reducing the likelihood that the listing of the second content as being of potential interest to the user is provided to the user in the future based on the user selection comprises preventing the listing of the second content as being of potential interest to the user from being provided.

28. The method of claim 23, further comprising:
identifying a time to display a listing of the first content; and causing to be displayed the listing of the first content at the time.

29. The method of claim 23, wherein determining that the first content is potentially of interest to the user is based on a cumulative time that the user spends watching the first content.

30. The method of claim 23, further comprising, in response to receiving the indication, reducing the likelihood that listings of programs similar to the second content as being of potential interest to the user are provided.

* * * * *